(12) United States Patent
Schnitt

(10) Patent No.: US 12,284,153 B2
(45) Date of Patent: *Apr. 22, 2025

(54) UNIFIED ELECTRONIC TRANSACTION MANAGEMENT SYSTEM

(71) Applicant: David Schnitt, Rancho Palos Verdes, CA (US)

(72) Inventor: David Schnitt, Rancho Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/519,574

(22) Filed: Nov. 5, 2021

(65) Prior Publication Data

US 2022/0255892 A1 Aug. 11, 2022

Related U.S. Application Data

(63) Continuation of application No. 16/129,761, filed on Sep. 12, 2018, now Pat. No. 11,171,911.

(Continued)

(51) Int. Cl.
*H04L 51/56* (2022.01)
*G06F 8/61* (2018.01)
*G06F 9/445* (2018.01)
*G06F 9/54* (2006.01)
*G06F 16/25* (2019.01)
*G06Q 20/02* (2012.01)

(Continued)

(52) U.S. Cl.
CPC .......... *H04L 51/56* (2022.05); *G06F 9/44505* (2013.01); *G06F 9/541* (2013.01); *G06F 16/258* (2019.01); *G06Q 20/02* (2013.01); *G06Q 20/102* (2013.01); *G06Q 20/12* (2013.01); *G06Q 20/16* (2013.01); *G06Q 20/3823* (2013.01); *G06Q 20/405* (2013.01); *G06Q 30/06* (2013.01); *G06Q 30/0635* (2013.01); *G06F 8/61* (2013.01); *G06F 2209/544* (2013.01); *H04L 63/0428* (2013.01)

(58) Field of Classification Search
CPC ..... H04L 51/56; H04L 51/066; H04L 67/565; H04L 61/5061; H04L 61/5014; H04L 61/5092; H04L 61/5053; G06F 9/541; G06F 16/258; G06Q 20/12; G06Q 20/3823; G06Q 30/0635; G06Q 20/10; G06Q 20/405; G06Q 20/027
See application file for complete search history.

(56) References Cited

U.S. PATENT DOCUMENTS 7,783,549 B1 * 8/2010 Benson ................. G06Q 40/06
  705/36 R
8,606,965 B1 * 12/2013 Parasnis ................ G06Q 30/06
  709/246

(Continued)

*Primary Examiner* — Alex H. Tran
(74) *Attorney, Agent, or Firm* — LIU & LIU

(57) ABSTRACT

A method and system for managing and automating the transactional processes between organizations that do business together using incompatible preexisting transactional systems. A centralized server manages transactions sent and received between the transactional systems of the organizations, and a software implemented messaging application communicates with the centralized server, both transmitting and receiving transactions from and to the transactional system of each organization, the result of which is improved automation of the transactional processes between organizations that do business together using incompatible preexisting transactional systems.

20 Claims, 14 Drawing Sheets

Related U.S. Application Data

(60) Provisional application No. 62/557,417, filed on Sep. 12, 2017.

(51) Int. Cl.
  *G06Q 20/10* (2012.01)
  *G06Q 20/12* (2012.01)
  *G06Q 20/16* (2012.01)
  *G06Q 20/38* (2012.01)
  *G06Q 20/40* (2012.01)
  *G06Q 30/06* (2023.01)
  *G06Q 30/0601* (2023.01)
  *H04L 9/40* (2022.01)

(56) References Cited

U.S. PATENT DOCUMENTS

| | | | | |
|---|---|---|---|---|
| 9,367,379 | B1 * | 6/2016 | Burke | G06F 11/0706 |
| 9,699,002 | B1 * | 7/2017 | Popillion | H04L 12/585 |
| 10,769,028 | B2 * | 9/2020 | Winokur | H04L 67/06 |
| 2002/0010686 | A1 * | 1/2002 | Whitesage | G06Q 10/063 |
| | | | | 705/80 |
| 2003/0197782 | A1 * | 10/2003 | Ashe | G07G 1/14 |
| | | | | 348/150 |
| 2008/0208738 | A1 * | 8/2008 | Mathew | G06Q 20/102 |
| | | | | 705/40 |
| 2010/0088206 | A1 * | 4/2010 | Lister | G06Q 20/10 |
| | | | | 705/34 |
| 2011/0276717 | A1 * | 11/2011 | Bellamy, III | G06Q 20/02 |
| | | | | 709/238 |
| 2011/0313917 | A1 * | 12/2011 | Lawson | G06Q 20/102 |
| | | | | 705/40 |
| 2013/0185196 | A1 * | 7/2013 | Kadur | G06Q 20/22 |
| | | | | 705/39 |
| 2013/0325722 | A1 * | 12/2013 | Mohan | G06Q 20/14 |
| | | | | 705/44 |
| 2014/0207592 | A1 * | 7/2014 | Kavis | G06Q 40/12 |
| | | | | 705/21 |
| 2014/0341217 | A1 * | 11/2014 | Eisner | H04L 67/147 |
| | | | | 370/392 |
| 2015/0193457 | A1 * | 7/2015 | Radhakrishnan | G06F 16/22 |
| | | | | 707/812 |
| 2016/0012433 | A1 * | 1/2016 | Marenick | G06Q 20/322 |
| | | | | 705/72 |
| 2016/0027013 | A1 * | 1/2016 | Modi | G06Q 20/203 |
| | | | | 705/65 |
| 2017/0286944 | A1 * | 10/2017 | Brown | H04W 12/0609 |
| 2017/0323354 | A1 * | 11/2017 | Martell | H04M 15/866 |

* cited by examiner

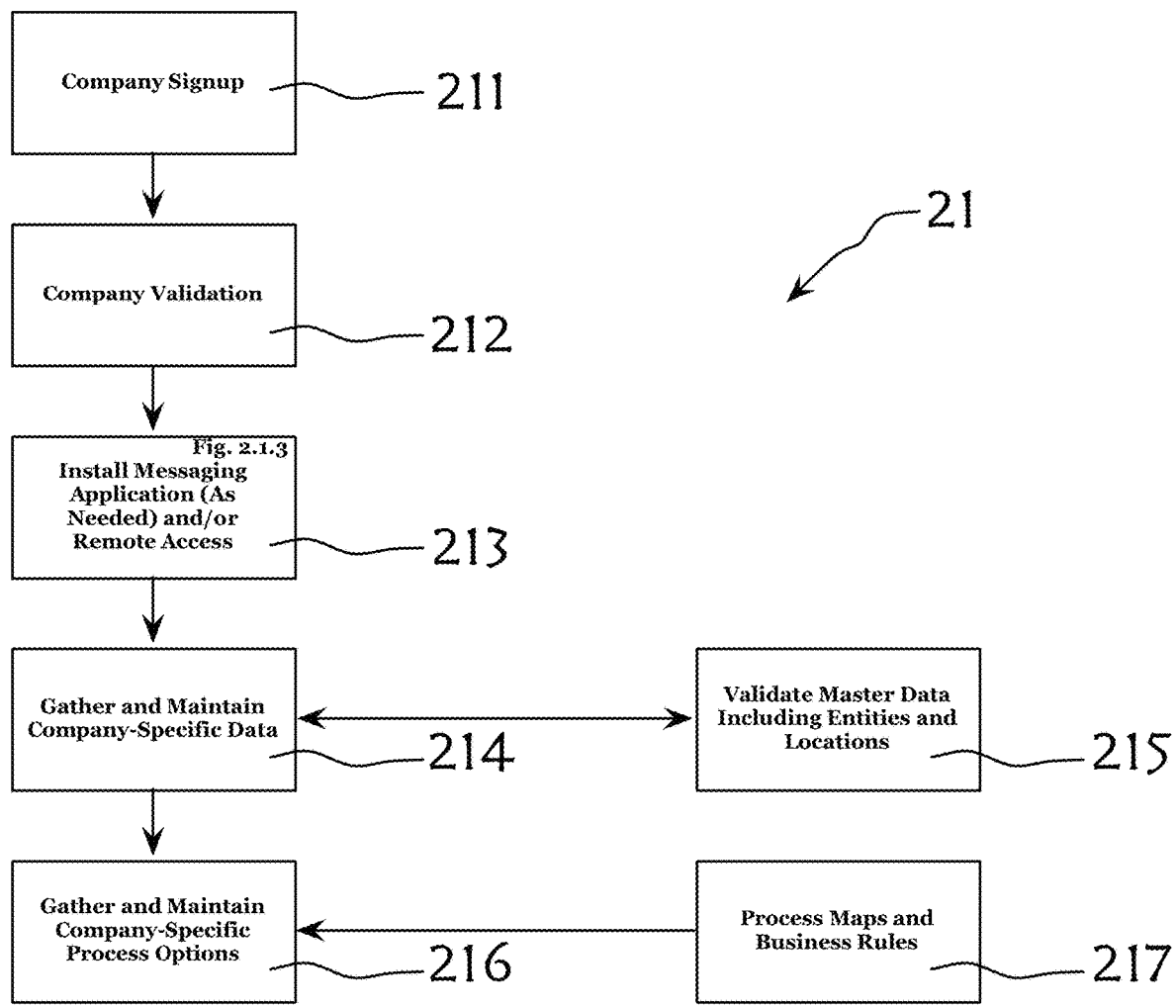
Fig. 2.1

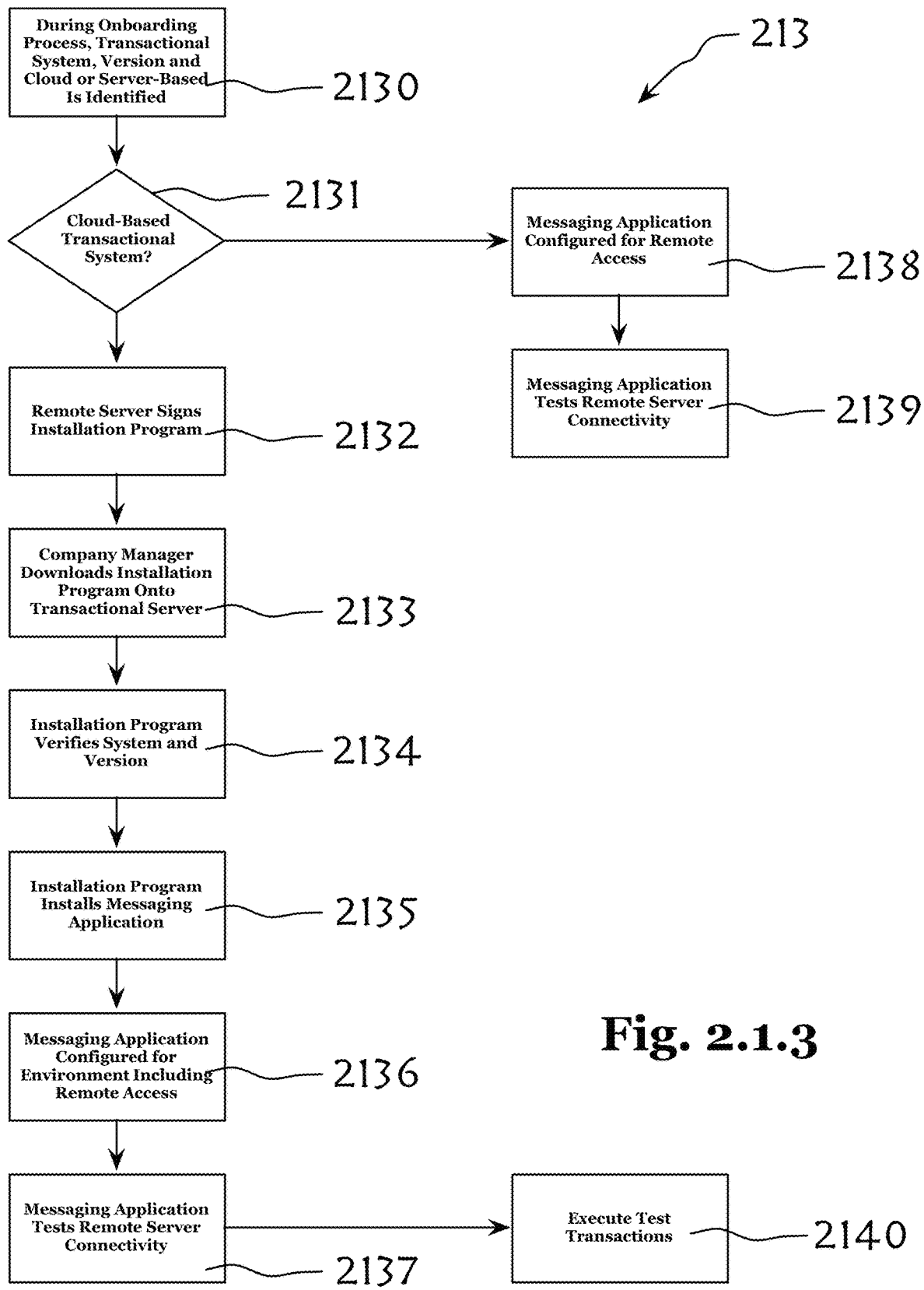
Fig. 2.1.3

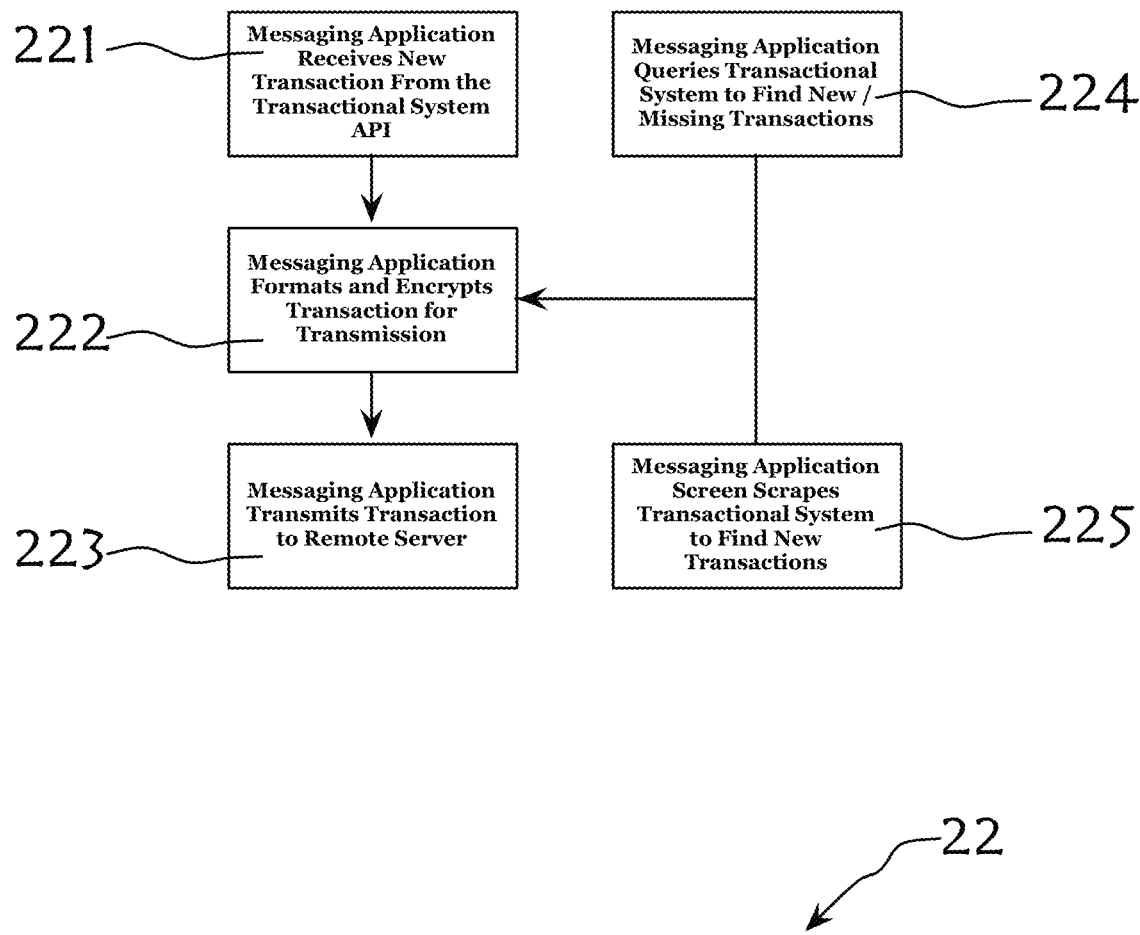
Fig. 2.2

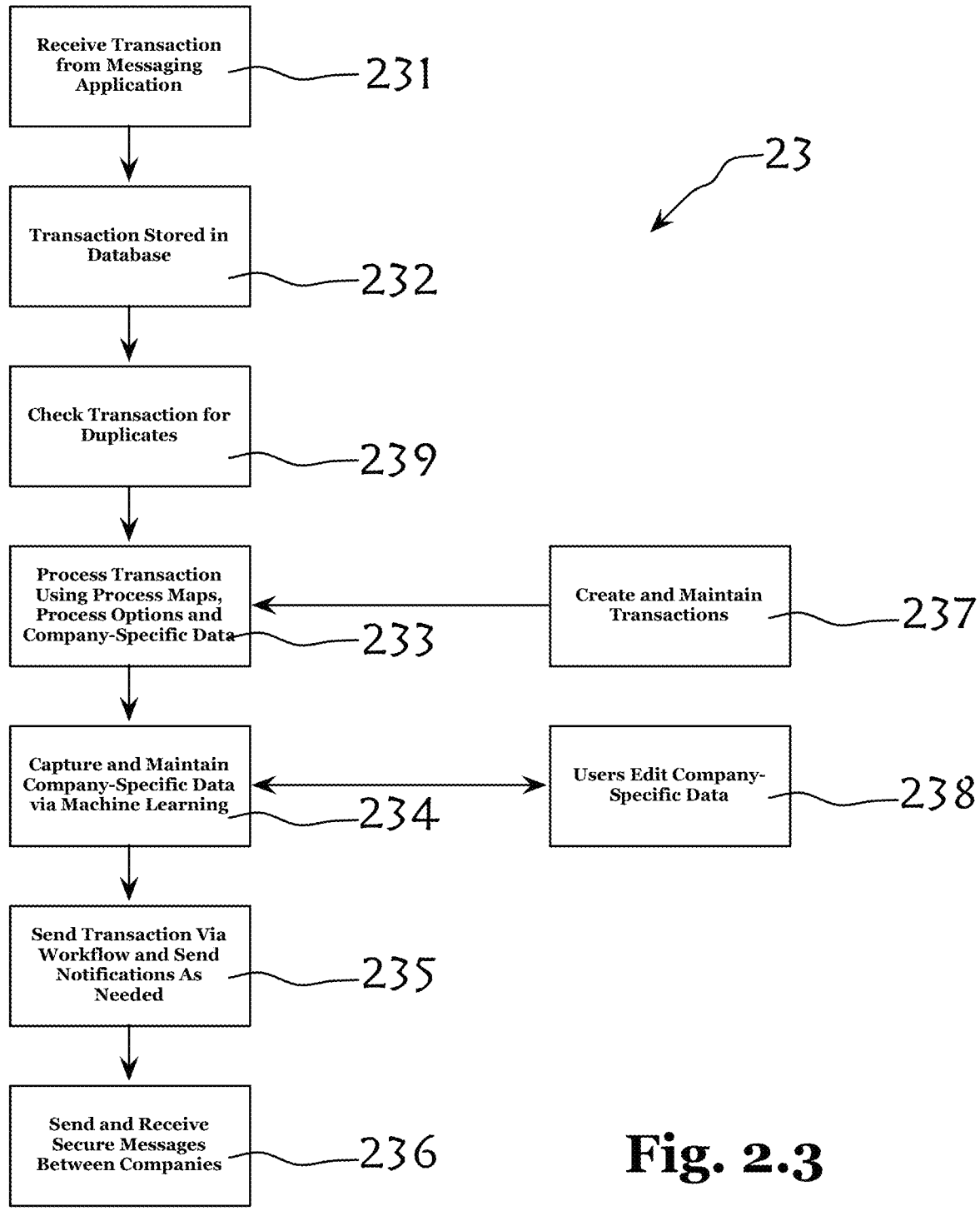
Fig. 2.3

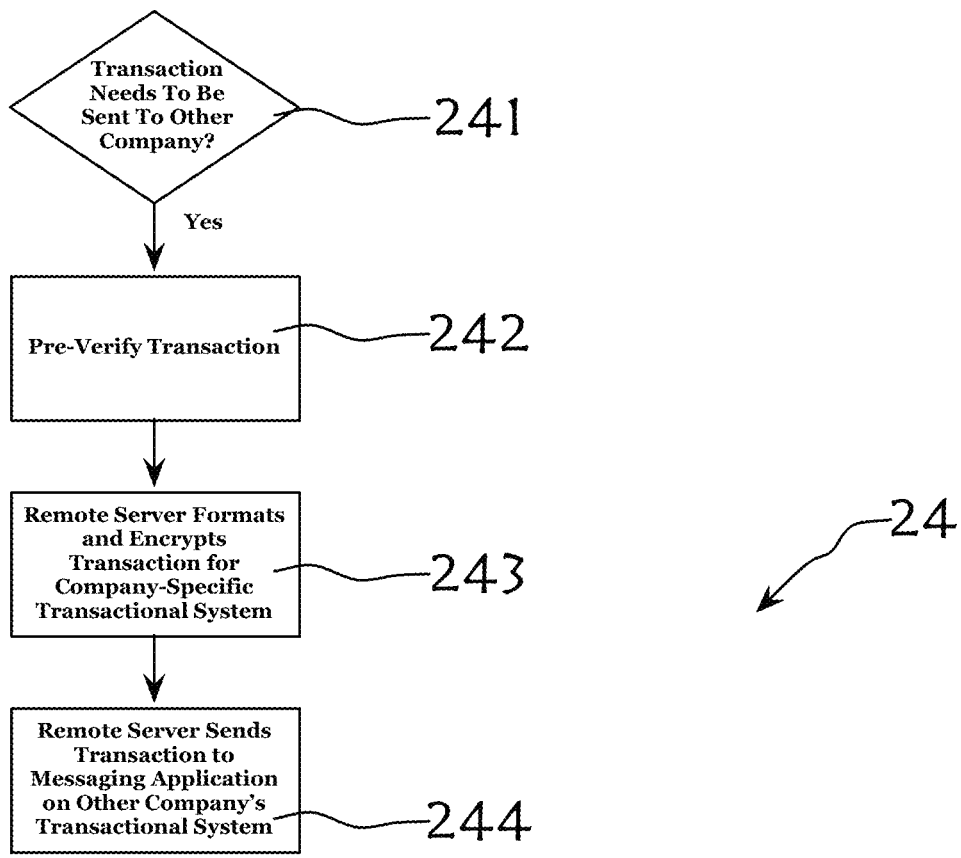
Fig. 2.4

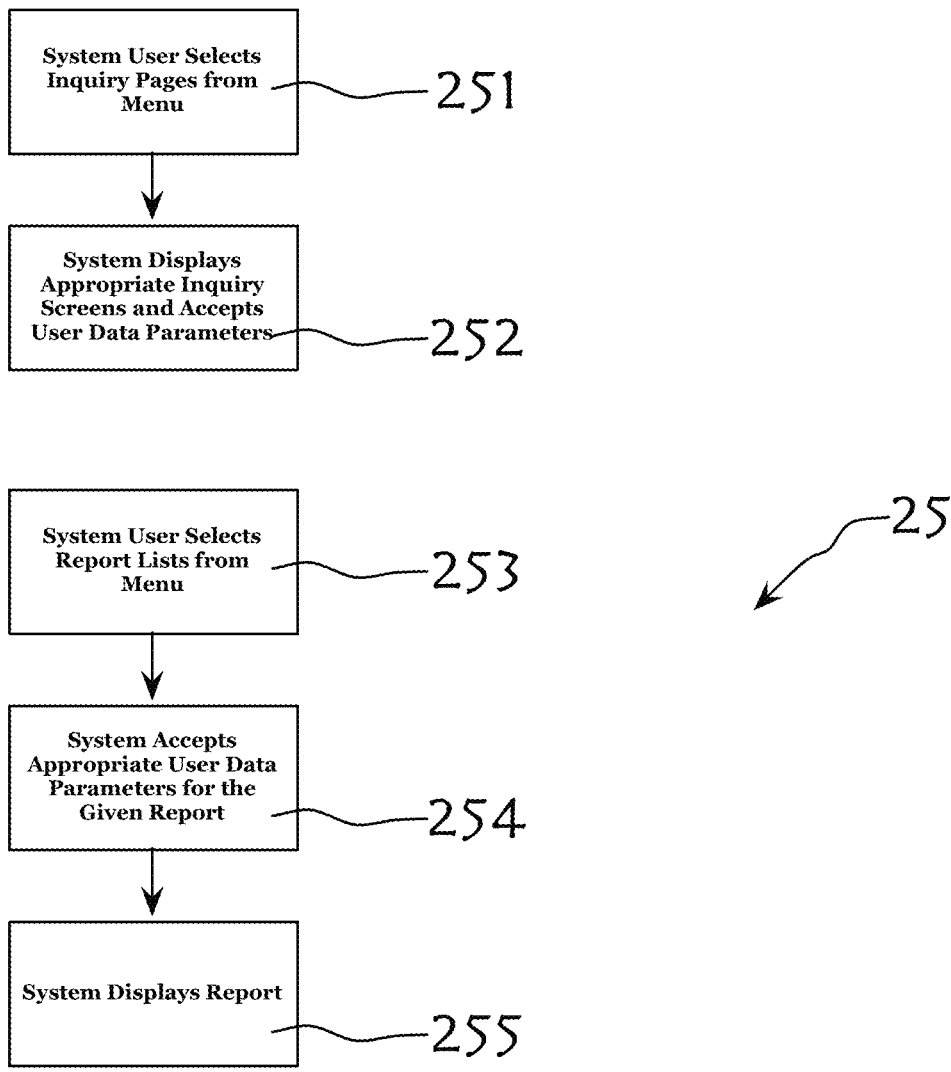
Fig. 2.5

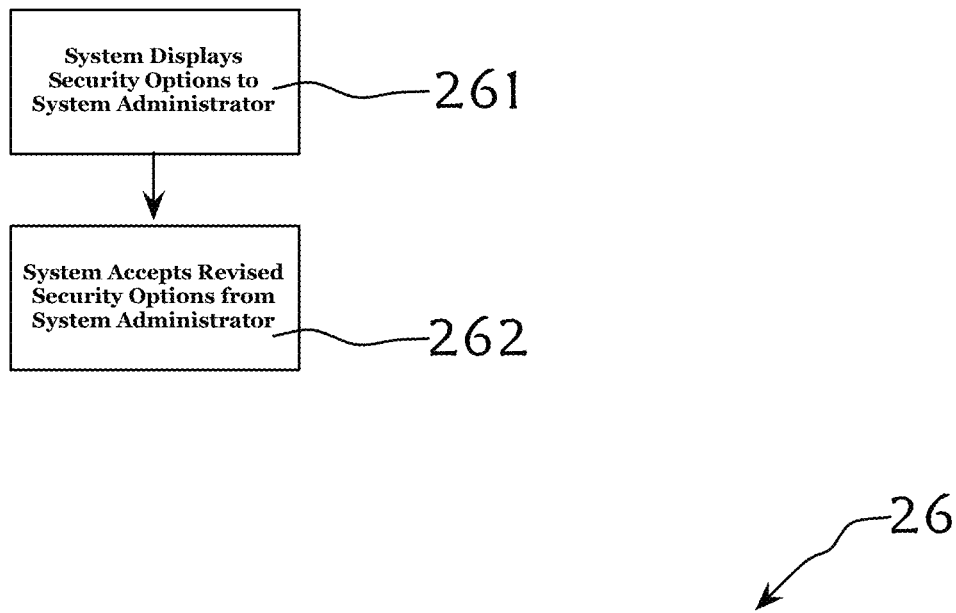
Fig. 2.6

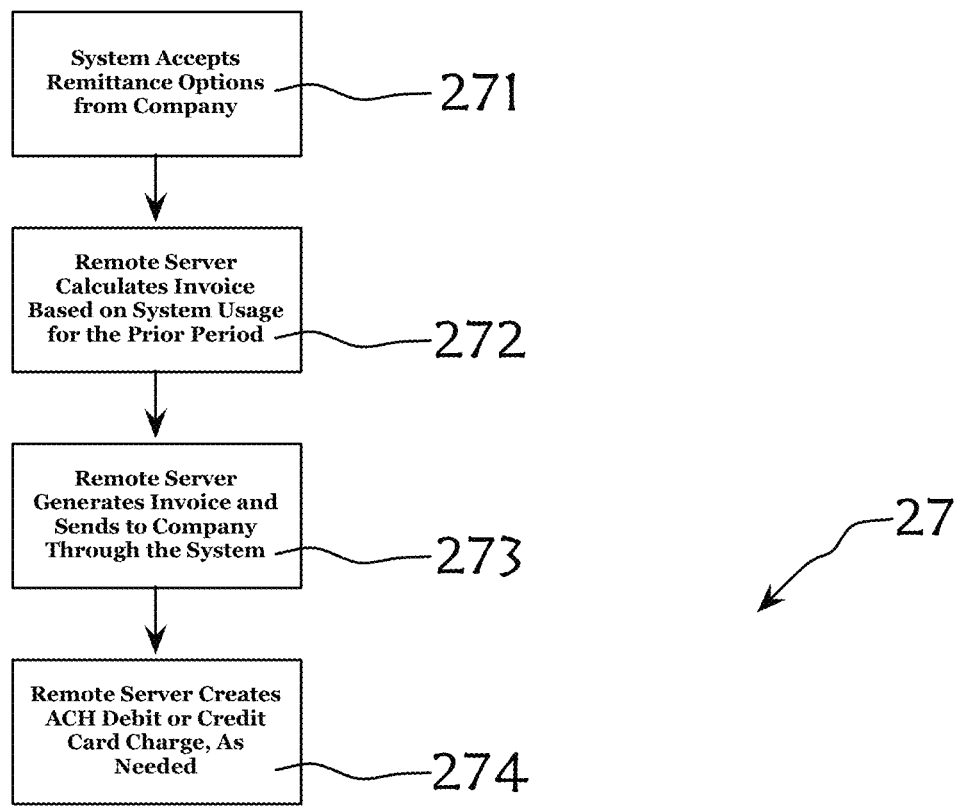
Fig. 2.7

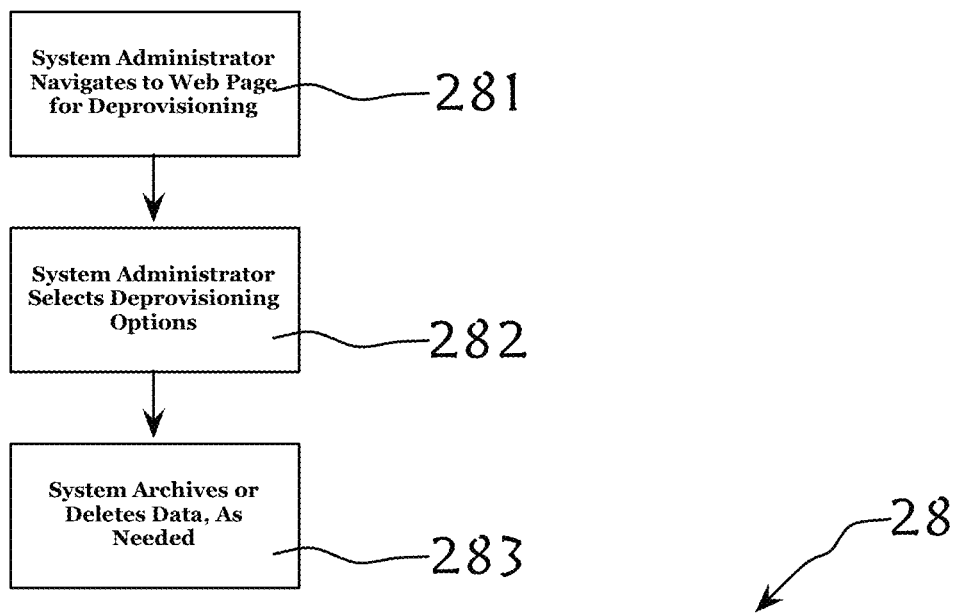
Fig. 2.8

UNIFIED ELECTRONIC TRANSACTION MANAGEMENT SYSTEM

CROSS REFERENCE TO RELATED APPLICATIONS

This application is a Continuation of U.S. application Ser. No. 16/129,761, filed on Sep. 12, 2018, which claims the priority of Provisional Patent Application No. 62/557,417, which was filed Sep. 12, 2017. This earlier application and all patent documents and other publications disclosed herein below are fully incorporated by reference, as if fully set forth herein.

BACKGROUND OF THE INVENTION

1. Field of the Invention

The present invention relates to the electronic communication of transactions between organizations, in particular a network-based application service for management of such transactions.

2. Description of Related Art

One of the first uses for computers was to automate accounting for organizations. From that time forward, organizations have tried to automate the sending and receiving of accounting, purchasing, inventory and other transactions such as invoices, bills, purchase orders and so on between themselves. In fact, the first Electronic Data Interchange (EDI) transaction was sent in 1965.

Despite decades of effort, however, due to the complexity of the transactions themselves (there are over 300 different types of EDI transactions), the incompatibility between different transactional systems, and the high IT costs to set up and maintain such electronic transactions; even if one were to successfully send an electronic transaction, few organizations can actually receive and process them without human intervention (which, of course, defeats the purpose of automating the transactions in the first place).

For example, even if an organization were to receive an invoice electronically, it still needs to either match it to a purchase order and receipt or provide general ledger coding and gain the necessary multiple organizational approvals. Similarly, if an organization were to receive a purchase order, it needs to be approved and converted to a sales order in the recipient's transactional system. This is not as easy as it sounds because most often the customer's transactional system has different item numbers, descriptions and pricing than the supplier's transactional system, so in most cases the purchase order needs to be manually converted to a sales order and entered.

As a result, over 50 years after the first EDI transaction was sent, less than 2% of all US business use EDI and many of those that do only use it for a subset of their financial transactions. So virtually all financial transactions are sent via paper today; in other words, a computer prints a piece of paper (or generates a PDF image, which is essentially the same thing) containing the relevant transaction information (such as an invoice), which is then sent to another organization to be hand-entered or possibly put into a paper scanner and then through an Optical Character Recognition (OCR) program (which requires human review to ensure it is accurate). These accounting and other transactional systems are, in fact, islands of automation that talk to one another primarily by paper.

In the past, various organizations have tried different approaches to overcome the limitations described above, all with very limited success. These solutions have generally come in several different flavors: Electronic Data Interchange, custom files, virtual printers, and proprietary networks.

Electronic Data Interchange (EDI)—EDI is an open source solution that specifies the format for different types of financial and other transactions. In the early days of EDI and before the internet, organizations had to subscribe to an expensive and cumbersome Value-Added Network (VAN) to be able to send and receive transactions. With the advent of the internet, a VAN is no longer needed. However, adoption has been very limited due to the fact that few transactional systems can natively send or import EDI transactions and organizations often use the EDI formats in widely varying ways. To use it, custom IT development is almost always required to set up EDI between two organizations. This is so expensive that only a large volume of transactions between the organizations (generally over several hundred or thousand per month) has a positive return on investment; such a transaction volume is generally incurred between only a small subset of suppliers and customers. So today EDI is generally used in certain industries such as retail where it has achieved a critical mass and even then, only between organizations that send each other very large volumes of recurring transactions. The cost to implement it is not worthwhile otherwise.

Even if EDI does make sense financially, human intervention is almost always required to fully process the transaction. For example, if an invoice is sent from one organization to another, humans still are required to perform a three-way match since few accounting systems handle this in an automated fashion (and those that do require significant effort to set up; few organizations with an accounting system that has automated match capability have turned it on). And no accounting system currently has the ability to automatically assign the proper general ledger coding to an invoice that does not have a purchase order.

Lastly, numerous incompatibilities exist between organizations that cause all sorts of problems and errors. For example, a food supplier to a restaurant may send one case of chicken at $100 but the restaurant will want to inventory it at 20 pounds of chicken at $5 per pound. Both metrics should be in the EDI file and the transaction should be imported using the weight metric, but most accounting systems will import the transaction with the case metric unless an expensive programmer modifies the program to import the weight metric. Similarly, a supplier may send an invoice with a unit price of $1.234 but the recipient's transactional system can only handle two decimal places and will import the transaction at $1.23, creating an error. Also, one organization may send an invoice with a 15 digit invoice number but the recipient's system can only handle invoice numbers with 12 digits.

Because custom IT work has to be performed on the transactional system, whenever an organization upgrades its system to a different version it has to test and ensure that the files still work. When EDI is implemented, it is implemented between one individual organization and another individual organization, which makes it time-consuming and expensive.

This is effectively a "last mile" problem. Similar to the cable organizations that had to wire up every household in the US to receive cable TV (and now internet and other services), every organization needs to build a custom software program to be able to send transactions back and forth.

Custom files—Instead of using EDI, organizations can create custom files to send to each other. These may be variants of EDI standard transactions, Excel files, text files or numerous other file types using custom formats. These suffer from all of the same problems as EDI files but in addition, both parties must have IT personnel develop custom programs to read and write these transactions out of and into the respective transactional systems. Like EDI, it is therefore only used for very high volumes of transactions.

Virtual Printers—Some organizations have pioneered the use of virtual printers to try and generate electronic transactions by having the sender of the transaction "print" documents to a virtual printer that intercepts the text on the document and creates an electronic transaction. While an improvement over custom files and EDI (if an organization does not have EDI capability), it still suffers from the same issues mentioned above. It is also only a one-way transaction from a supplier to a customer, and the customer still needs a way to ingest the transaction into its transactional system.

Because of these issues, virtual printers are often used only when one party (generally the customer that wishes to reduce their accounts payable processing costs) forces the other party (generally the supplier) to use this type of software to do business with them electronically. It has even less adoption that EDI or custom files.

Proprietary Networks—Some vendors (such as RosettaNet, Exostar, Tradeshift, or Ariba) have created proprietary networks to send transactions back and forth between different organizations, focused primarily on procurement and accounts payable automation. As with the other solutions, expensive IT effort is usually needed, often including custom programs that need to be developed to send and receive files. Even then, once files are received they still need to be processed, often manually. Their models differ in terms of cost (including whether a supplier has to pay or not) but are all focused on enrolling a customer which then forces its largest suppliers to join, as this model benefits the customer more than the supplier; the customer saves significant accounts payable processing costs, while it is expensive and difficult for the supplier to build custom files to be exported from their transactional system. A customer will typically need to enroll its suppliers one-by-one. These systems have also been around for many years (for example, Ariba started in 1996) and have complex and expensive implementations. Many studies have shown that these proprietary networks often get suppliers to sign up, but they stop using the solution quickly and only a few remain as users of the solution. Due to these issues, the networks have achieved little market penetration. For example, RosettaNet has been in business since 1998 but has only 500 organizations signed up for its service.

SUMMARY OF THE INVENTION

The present invention is directed to a Unified Electronic Transaction Management System that comprises a network-based software implemented process, which facilitates and processes electronic transactions conducted utilizing incompatible transactional systems of users (i.e., individuals and/or organizations, sharing the roles of customers, suppliers, etc.) without requiring modifications to the preexisting transactional systems, overcoming the drawbacks of the prior art.

In one aspect of the present invention, the Unified Electronic Transaction Management System is fundamentally comprised of two software implemented applications: a network-based application service and a messaging application associated with each transactional system. The network-based application service is resident on remote servers accessed over a network (e.g., the Internet). More particularly, the Unified Electronic Transaction Management System of the present invention comprises a unified electronic transaction management system remote server communicating with remote user transactional systems via messaging applications over a network. Each messaging application can be custom configured/tailored to the transactional system of a particular organization, for example, using plug-ins. The messaging applications translate the data and data formats received from one transactional system to a common format for processing by the remote transaction management server, and also translate the data and data formats from the common format in the remote transaction management server that are sent to a different transactional system. Thus, via the messaging applications associated with the corresponding transactional systems, the remote transaction management server is capable of interacting with the transactional systems of various users in accordance with the particular data format of the transactional system associated with each user. As a result, the transaction management server facilitates compatibility between different or otherwise incompatible transactional systems of two users. The user transactional systems are able to utilize the transaction management server to conduct electronic transactions in a universal and/or transactional system platform independent manner, without requiring one user to have knowledge of the type or configuration of the transactional system of the other user.

In the case of a cloud-based transactional system, the messaging application may be installed on an organization's local server(s), or the messaging application may be integrated into the network-based application service.

For non-cloud-based transactional systems, the messaging application may be installed by the organization on the server that houses their transactional system(s). This could include the accounting system, Enterprise Resource Planning (ERP) system, purchasing system, inventory system, or other transactional system. Its job is to communicate with the transactional system to send transactions from the transactional system to the network-based application service, as well as to receive transactions from the network-based application service and send them to the transactional system. The messaging application "listens" for a new or amended transaction to appear in the transactional system and then sends that transaction to the network-based application service. Similarly, when the network-based application service receives a transaction from another organization destined for the recipient organization, it sends that transaction to the messaging application which inserts the transaction electronically into the transactional system. Through this method, organizations can send and receive transactions from one transactional system to another instead of through paper documents (or digital formats or renditions of paper documents, e.g., PDF format) or by building expensive customized connection solutions (such as EDI).

The network-based application service is a scalable, server-based, integrated set of applications that communicate with the messaging applications installed alongside various organizations' transactional systems. It essentially receives a transaction from one organization's messaging application and forwards it to the other organization's messaging application that is designated to receive it. In many cases, and in a series of embodiments, the network-based application service also processes the transaction without manual intervention. For example, if an organization (e.g., a customer) sends a purchase order to another organization (e.g., a supplier), the service may automatically approve that purchase order based on pre-established business rules or electronically route it using a workflow component of the network-based application service for approval by the appropriate personnel at the supplier, may validate pricing on that purchase order, and may convert that purchase order into a sales order, send it to the messaging application resident on the transactional system server of the supplier, and then create a sales order in the supplier's transactional system.

In the context of the present invention, for purpose of managing electronic transactions, the network-based application service of the remote server does not include application services to execute sales transactions on online sales platform, shopping portal, ecommerce platform, etc., even though it may also include capabilities to support these additional application services outside of/beyond managing electronic transactions in the context of the present invention. Instead, the inventive network-based application service facilitates, processes, and manages electronic translations in the context discussed hereinbelow short of executing electronic transactions between two parties. Between two parties (e.g., a buyer and a supplier), the preexisting transactional systems of the respective parties interact with each other via corresponding messaging applications and the network-based application service, to handle the functions to create/initiate electronic transactions, respond to the electronic transactions, and execute the transactions between the two preexisting transactional systems of the parties. The network-based application service relies on the functions of the preexisting transactional systems of the parties to create and execute the electronic transactions between the parties. The network-based application service together with the messaging application enable a compatible conduit for interactions between the transactional systems of the parties.

In another aspect of the present invention, the unified system's functions may be centralized on the remote server, with complementary electronic transaction related functions (e.g., in user or client devices) in network communication with the unified system via the messaging application. Electronic transaction data may also be stored in a centralized database associated with the unified system.

As used throughout herein, "unified" refers to user perspective of unification of functions (e.g., most of the back-office electronic transaction management functions) in a system, where the system processes transactions and makes available to its users its available capabilities. "Centralized" refers to the management of user data and/or more critical activities and/or components at a centrally managed device or a group of devices in a single location or a cluster of distributed locations that are logically linked (collectively, a "remote server"). "Universal" refers to the transactional system independent aspect of the inventive unified system, in which electronic transactions between incompatible user transactional systems can be facilitated without requiring software modifications (i.e., at a source code level, involving reprogramming, reloading, rebuilding, etc.) to the preexisting transactional systems. "User" refers to an individual, an organization (e.g., a business entity, a legal entity, etc.) or its representative, which utilize a transactional system to conduct one or more electronic transactions (hereinafter, "user" and "organization" may be referenced interchangeably, with references to "organization" also apply to "user", or vice versa, as appropriate to the context of discussions hereinbelow). "Electronic transaction" refers to a transaction relating to, without limitations, tangibles such as products, goods, services; non-tangibles such as financial products, securities; real estate; or banking.

With both the functionality of the messaging application and that of the network-based application service, the limitations of the prior art are eliminated and any organization may send and receive transactions as well as process them without the need for IT custom programming; the "last mile" problem is eliminated so every organization can communicate electronically with their business partners no matter what transactional system they have. In addition, because the network-based application service is centralized and has a database of all of the enrolled organizations, it allows each of those organizations to communicate with all of its business partners, not just establish one-to-one electronic relationships, overcoming another serious limitation of the prior art.

In one aspect, the present invention comprises various combinations of features outlined below:

A unified electronic transaction management system that manages electronic transactions between a first transactional system and a second transactional system over a network, comprising: a first messaging application interacting with the first transactional system that operates on a first transaction data in a first data format, wherein the first messaging application converts the first transaction data between the first data format and a common data format; a second messaging application interacting with the second transactional system that operates on a second transaction data in a second data format different from the first data format, wherein the second messaging application converts the second transaction data between the common data format and the second data format, wherein the common data format is different from the first and second data formats; a remote server interacting with the first messaging application and the second messaging application over the network, wherein the remote server including an application service receiving and processing converted transaction data in the common data format converted by the first and second messaging applications, and forwarding processed converted transaction data in the common data format to the first and second messaging applications; and a database associated with the remote server, storing the converted transaction data received by the remote server and processed converted transaction data and other data related to processing of the electronic transaction, wherein the first messaging application extracts and converts the first transaction data in the first data format received from the first transactional system into the converted transaction data, and forwards the converted transaction data in the common data format to the remote server, wherein the remote server receives and processes the converted transaction data in the common data format received from the first messaging application, stores said converted transaction data in the database, and forwards the processed converted transaction data in the common data format to the second messaging application, wherein the second messaging application receives and converts the processed converted transaction data in the common data format from the remote server into the second transaction data in the second data format, and loads the second transaction data in the second data format into the second transactional system, and wherein the second transaction data is loaded into the second transactional system without manual intervention, whereby the remote server manages electronic transactions created and executed by and between the first and second transactional systems via the first and second messaging applications.

The remote server comprises a list of data fields that have different characteristics in different transactional systems, and conversion rules for converting data from a data field in one transactional system to data for a data field in another transactional system, and wherein the remote server processes the converted transaction data received from the first messaging application comprising executing the conversion rules to convert the converted transaction data received from the first messaging application corresponding to the first transactional system to processed converted transaction data to be transmitted to the messaging application corresponding to the second transactional system. The application service of the remote server comprises predefined process maps for different types of business processes, wherein during installation a system user chooses options in a series of web pages in the system to choose process options specific to its transactional system that is tailored for the system user's organizational environment, wherein web pages are presented to the system user to gather information required to execute the process maps, and wherein the application service utilizes the process options and the gathered information to execute the process maps. The remote server routes electronic transactions requiring approval or to resolve exceptions, based on process maps, process options and gathered data. The remote server verifies in a verification process new electronic transactions utilizing data in the database obtained from both the first and second transactional systems, wherein mismatches of data concerning a transaction determined by the verification process are routed to appropriate system user(s) to approve, reject or modify such transaction before remote server they are sent to the messaging application of the intended receiving transactional system.

The application service of the remote server may further comprise application programming interfaces (APIs) that allow external parties to submit to and receive from the remote server electronic transactions for organizations that use the system. The application service of the remote server further comprises an application that an authorized representative of the user can download onto a server for the user's transactional system, and wherein the application searches the contents of the user's transactional system to correctly identify the transactional system and version installed and validates said transactional system and version, prior to installing the messaging application on the server requiring technology staff intervention. The application service of the remote server further comprises web pages to support an enrollment process, which allow a user to enroll to the service by entering a series of data values pertinent to the user, wherein the application service of the remote server receives validation of key data entered by the user during the enrollment process, and wherein the application service of the remote server maintains and validates physical location and financial entity information for the user during and after the enrollment process. The messaging application is electronically signed to properly identify the organization on whose transactional system server it is installed.

The first and second messaging systems are installed to be tailored to preexisting first and second transactional systems, respectively, by configuring the first and second messaging systems respectively to the corresponding preexisting first and second transactional systems, to allow the preexisting first and second transaction systems to conduct electronic transactions based on business rules and logics existing in the first and second messaging system and the remote server without reconfiguration of the respective first and second transactional systems. The first and second messaging applications are installed and associated with preexisting first and second transactional systems, respectively, without requiring reprogramming or modification of preexisting first and second transactional systems. The first and second messaging systems are custom configured to the respective first and second transactional systems using plug-ins, which include transactional system data converter, transactional system data logic, and transactional system connector. The application service of the remote server is transactional system independent.

For a cloud-based transactional system, the corresponding messaging application is installed on a server of the cloud-based transactional system, or installed on the remote server, and for a server-based transactional system, the corresponding messaging application is installed on a server of the server-based transactional system. The application service of the remote server comprises web pages that gather credential information to allow user access to existing web pages and APIs remotely where the transactional system is a cloud-based transactional system, and the application service of the remote server comprises web pages that gather credential information to allow user access to existing screens and APIs remotely where the transactional system is a server-based transactional system. The messaging application is embedded into the programming code of the transactional system on a server-based transactional system.

If one of the first and second messaging applications cannot connect to the remote server or encounters an error, it sends a message to a designated administrator. The application service of the remote server further comprises web pages that allow system users to enter transactions manually (non-electronic) into the remote server. The application service of the remote server provides the option to allow third parties to add applications and/or services to the system. The application service of the remote server enables secure messages to be sent between the first and second transactional systems to resolve any issues, while linking the secure messages to the electronic transaction between the first and second transactional systems. The remote server provides a series of online dashboards, inquiry pages and reports to allow the first and second transaction systems to obtain the status of the electronic transaction in real-time. The messaging application encrypts data before sending it to the remote server.

A process of unified management of electronic transactions between a first transactional system and a second transactional system over a network, which comprises process implementations of various combinations of the features outlined above.

BRIEF DESCRIPTION OF THE DRAWINGS

For a fuller understanding of the scope and nature of the invention, reference should be made to the following detailed description read in conjunction with the accompanying drawings that depict system modules, functionality and processes.

FIG. 2.1 is a diagram depicting the process for company onboarding and maintenance, in accordance with one embodiment of the present invention.

FIG. 2.1.3 is a diagram depicting the process for installing the messaging application during company onboarding, in accordance with one embodiment of the present invention.

FIG. 2.2 is a diagram depicting the process for the messaging application to receive transactions from the transactional system and for the remote server to accept incoming transactions from the messaging application, in accordance with one embodiment of the present invention.

FIG. 2.3 is a diagram depicting the process for the remote server to allow users to create transactions and process each transaction, in accordance with one embodiment of the present invention.

FIG. 2.4 is a diagram depicting the process for the remote server to transmit the output of that transaction to the messaging application, in accordance with one embodiment of the present invention.

FIG. 2.5 is a diagram depicting the process for the remote server to provide the system users with an array of online inquiries and reports on status of all transactions in real-time, in accordance with one embodiment of the present invention.

FIG. 2.6 is a diagram depicting the process for the remote server to provide system security and logging capabilities and allow access of the data to users, in accordance with one embodiment of the present invention.

FIG. 2.7 is a diagram depicting the process for the remote server to bill the system users for the services provided and collect funds, in accordance with one embodiment of the present invention.

FIG. 2.8 is a diagram depicting the process for the remote server to de-provision any organizations that terminate their system enrollment, in accordance with one embodiment of the present invention.

DETAILED DESCRIPTION OF EMBODIMENTS OF THE INVENTION

Figure 1:
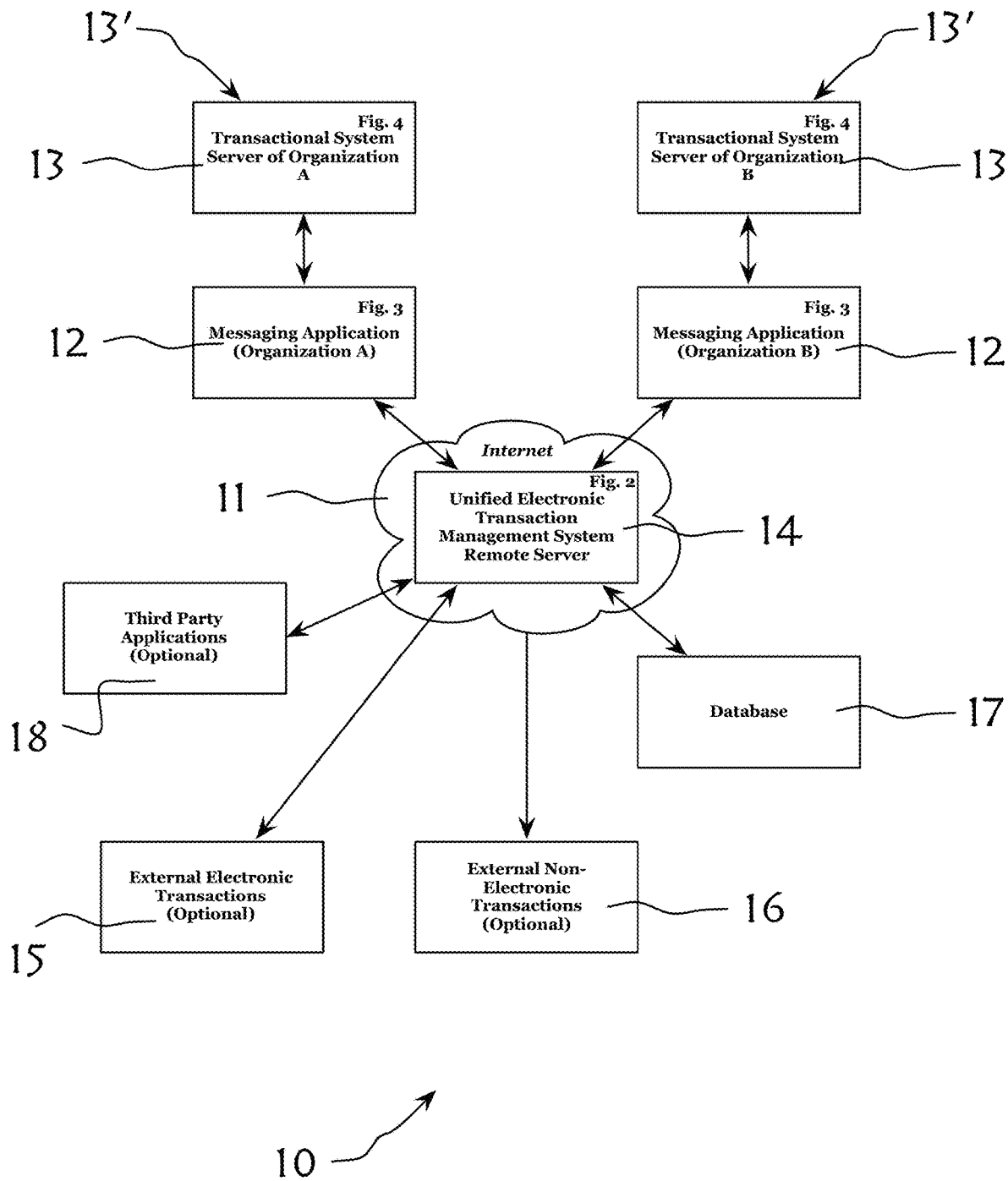
FIG. 1 is a high-level system diagram depicting the centralized, unified electronic transaction management system, in accordance with one embodiment of the present invention.

The present description is of the best presently contemplated mode of carrying out the invention. This description is made for the purpose of illustrating the general principles of the invention and should not be taken in a limiting sense. The scope of the invention is best determined by reference to the appended claims.

The detailed descriptions of the Unified Electronic Transaction Management System and process of the present invention are presented in terms of schematics, functional components, methods or processes, symbolic or schematic representations of operations, functionalities, and features of the invention. These descriptions and representations are the means used by those skilled in the art to most effectively convey the substance of their work to others skilled in the art. A software-implemented function, method, or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated by associated hardware, software, and firmware.

Useful devices for performing the software-implemented processes, operations, and functions of the present invention include, but are not limited to, general- or specific-purpose digital processing and/or computing devices, which devices may be standalone devices or part of a larger system; portable, handheld, or fixed in location. Different types of client and server devices can be configured to implement the electronic applications of the present invention. For example, the electronic messaging application and the network-based application service of the present invention may be accessed using different types of client computing devices. The invention is operational with numerous other general purpose or special purpose computing system environments or configurations. Examples of well-known computing systems, environments, and/or configurations that may be suitable for use with the invention include, but are not limited to, personal computers, server computers, handheld or laptop devices, multiprocessor systems, microprocessor-based systems, set-top boxes, programmable consumer electronics, network PCs, minicomputers, mainframe computers, embedded systems, distributed computing environments that include any of the above systems or devices, and the like. For example, portable computing devices may include notebook computers, netbook computers, tablet devices, etc., and handheld devices may include smart phones, PDAs (personal digital assistants), etc.

These devices may be selectively activated or configured by a program, routine and/or a sequence of instructions and/or logic stored in the devices to execute the disclosed functions, processes, and operations. In short, use of the processes, functions, and operations described and suggested herein is not limited to a particular processing configuration.

For purposes of illustrating the principles of the present invention and not by limitation, the present invention is described herein below by reference to an exemplary system. However, it is understood that the present invention is equally applicable to systems of other configurations embodying the invention, without departing from the scope and spirit of the present invention.

System Overview

The Unified Electronic Transaction Management System comprises a network-based, software-implemented process (i.e., network-based application service) that is designed to provide its users with access to a unified system and process of transmitting and receiving transactions from one organization to another. The Unified Electronic Transaction Management System is fundamentally comprised of two software implemented applications: a network-based application service and a messaging application associated with each user of electronic transactions. The network-based application service is resident on remote servers accessed over a network (e.g., the Internet).

In one aspect, the Unified Electronic Transaction Management System may comprise a Unified Electronic Transaction Management System remote server (implemented with the network-based application service) in network communication with a messaging application that is a computer program, resident on an organization's server, that operates their transactional system; the messaging application transmits and receives transactions to and from the transactional system, as well as queries the transactional system for various types of data used to process these transactions. The unified system allows anyone, including non-programmers, to install the messaging application and allow their organization to communicate with other organizations electronically. The Unified Electronic Transaction Management System also has a database that stores transaction details, user details, and so on. The Unified Electronic Transaction Management System allows an organization to automatically transmit any or all transactions from its transactional system to any other organization that also has the messaging application installed on their transactional system; in fact it allows both organizations to transmit and receive all of the transactions they need to conduct their business together such as purchase orders, invoices, remittance information, and so on.

In another aspect of the present invention, the Unified Electronic Transaction Management System functions may be centralized, with the complementary user-related functions in network communication with the unified system (e.g., transaction approvers).

In the illustrated embodiment shown in FIG. 1, the Unified Electronic Transaction Management System 10 may comprise a centralized and unified transaction management system remote server 14, which communicates over the network 11 (e.g., Internet) with a messaging application 12 installed on an organization's transactional system server 13' used to transmit and receive transactions from the transactional system to other organizations that it does business with, a database 17 that stores the transaction data associated with the remote server 14, external electronic transaction(s) 15 that optionally are received from systems other than the unified system via electronic methods or sent via electronic methods to systems other than the unified system when an organization does not have the messaging application installed on their transactional system server, external non-electronic transaction(s) 16 that optionally are received from systems other than the unified system via wholly or partially non-electronic methods and entered manually into the remote server or sent via non-electronic methods to systems other than the unified system when an organization does not have the messaging application installed on their transactional system server, and optionally third-party applications 18 that are installed on the remote server that perform specific functions.

Computing Environment Including Information Exchange Network (10)

The Unified Electronic Transaction Management System in accordance with the present invention may involve, without limitation, distributed information exchange networks, such as public and private computer networks (e.g., Internet, Intranet, WAN, LAN, etc.), value-added networks, communications networks (e.g., wired or wireless networks), broadcast networks, and a homogeneous or heterogeneous combination of such networks. As will be appreciated by those skilled in the art, the networks include both hardware and software and can be viewed as either, or both, according to which description is most helpful for a particular purpose. For example, the network can be described as a set of hardware nodes that can be interconnected by a communications facility, or alternatively, as the communications facility, or alternatively, as the communications facility itself with or without the nodes. It will be further appreciated that the line between hardware and software is not always sharp, it being understood by those skilled in the art that such networks and communications facility involve both software and hardware aspects.

The Internet is an example of an information exchange network including a computer network in which the present invention may be implemented. Many servers are connected to many clients (which may be desktop, portable, and/or handheld devices) via the Internet network, which comprises a large number of connected information networks that act as a coordinated whole. Details of various hardware and software components comprising the Internet network (such as servers, routers, gateways, etc.) are well known in the art. Access to the Internet by the servers and clients may be via suitable transmission media, such as Ethernet, satellite, telephone wires, wireless RF links, Wi-Fi, Bluetooth, or the like; and user interface tools, such as browsers, implemented therein. Communication between the servers and the clients takes place by means of an established protocol. As will be noted below, the unified forms electronic transaction management system of the present invention may be configured in or as one or more of the servers, which is accessible by a user via one or more of the client devices.

Figure 5:
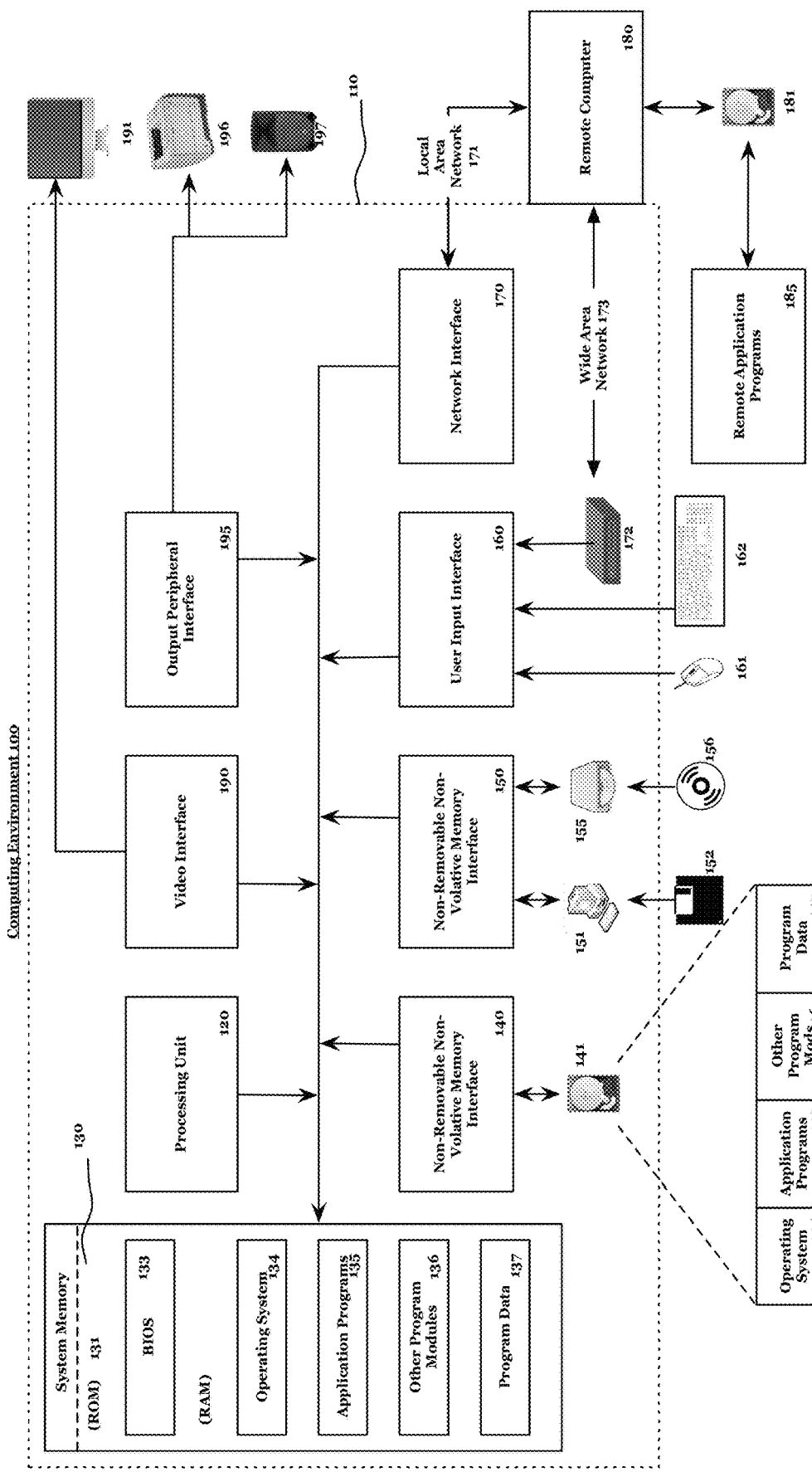
FIG. 5 is a schematic diagram of an exemplary computing environment in which aspects of the invention may be implemented, in accordance with one embodiment of the present invention.

FIG. 5 shows an exemplary computing environment 100 in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types, including the networked-based (e.g., web-based) application of the Unified Electronic Transaction Management System and process described herein below. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general-purpose computing device in the form of a computer 110 (which is exemplary of the components adopted by servers and/or clients). Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may also be implemented as a point-to-point connection, switching fabric, or the like among the communicating devices.

Computer 110 typically includes a variety of computer-readable media. Computer readable media can be any available media that can be accessed by computer 110 and includes both volatile and non-volatile media, removable and non-removable media. Communication media typically embodies computer-readable instructions, data structures, program modules or other data in a modulated data signal (i.e., a signal that has one or more of its characteristics set or changed in such a manner as to encode information in the signal) such as a carrier wave or other transport mechanism and includes any information delivery media. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read-only memory (ROM) 131 and random-access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable, volatile/nonvolatile computer storage media. By way of example only, FIG. 5 illustrates a hard disk drive 141, a magnetic disk drive 151 that reads/writes a removable magnetic disk 152, and an optical disk drive 155 that reads/writes a removable optical disk 156, such as a CD ROM or other optical media. The hard-disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5 provide storage of computer-readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules accessible by the computer 110, or portions thereof, may be stored in the remote memory storage device 181. By way of example, and not limitation, FIG. 5 illustrates remote application programs 185 as residing on memory storage device 181 associated with the remote computer 180. It will be appreciated that the network connections shown are exemplary and other means of establishing a communications link between the computers may be used.

In the below disclosed embodiment of the present invention, the unified electronic transaction management system of the present invention may be implemented as the network-based application service represented by the remote application programs 185 residing in the memory storage device 181, which is accessed by the computer 110 and executed via the remote computer 180, within the environment shown in FIG. 5. In other words, the remote computer 180 undertakes the functions of a server, and the computer 110 undertakes the role of a client, in reference to the network environment shown in FIG. 5.

This invention works in conjunction with existing technologies, which are not detailed here, as they are well known in the art and to avoid obscuring the present invention. Specifically, methods currently exist involving the Internet, web-based tools and communication, and related methods and protocols.

Remote Server (14)

Figure 2:
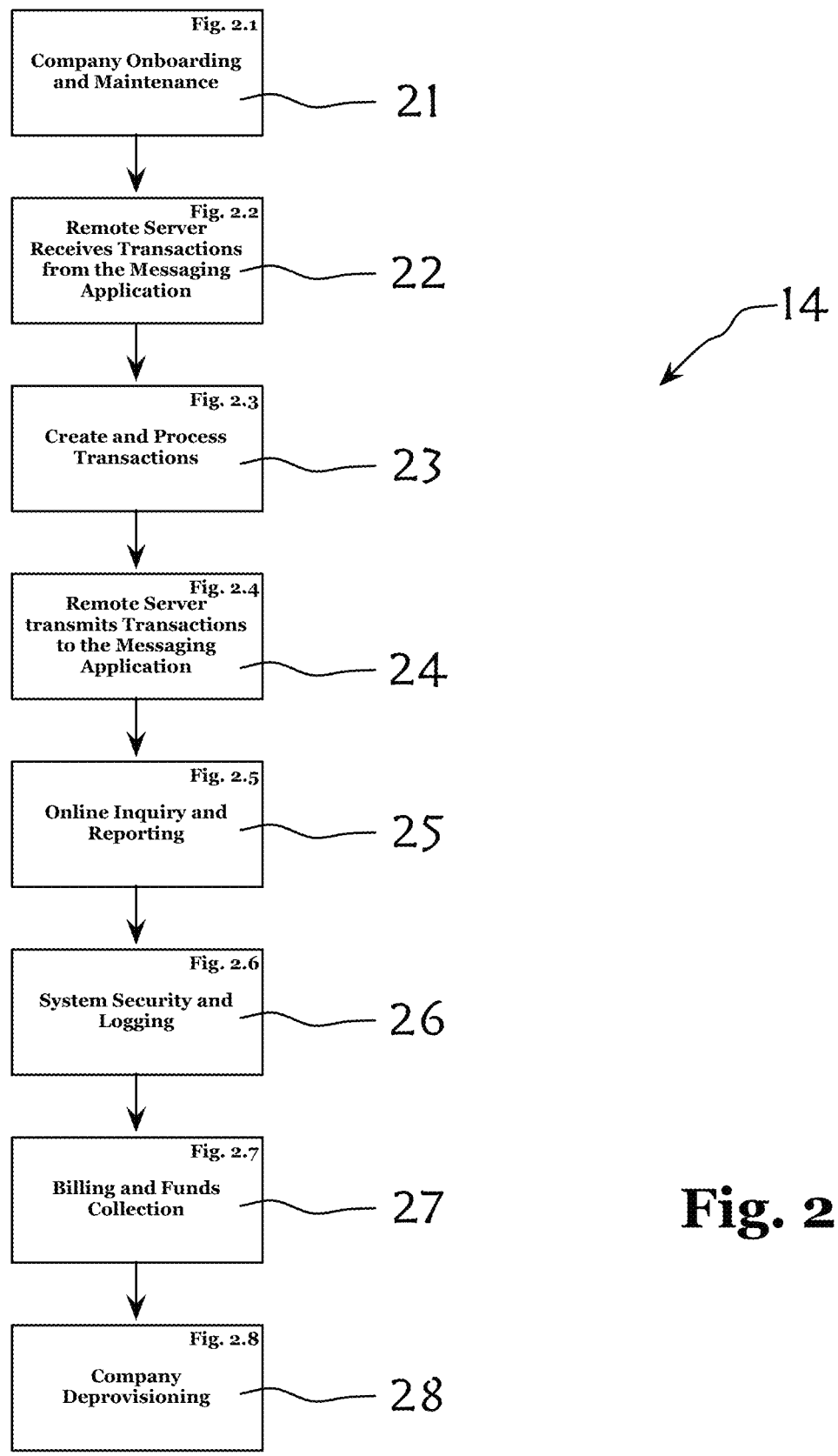
FIG. 2 is a diagram depicting the primary functions of the remote server, in accordance with one embodiment of the present invention.

The "center" of the Unified Electronic Transaction Management System is the remote server, which manages the entire system. FIG. 2 schematically illustrates the functional blocks which may comprise the network-based application service, of the remote server 14, in accordance with one embodiment of the present invention. Each functional block will be separately discussed below in reference to sub-level figures (FIGS. 2.1 to 2.8).

The remote server's 14 main jobs are to onboard new organizations (including installing the messaging application as needed and gathering and maintaining all of the required organization-specific information for the remote server 14; at 21, and elaborated in FIG. 2.1), accept incoming transactions from the messaging application installed on a source organization's transactional server (at 22, and elaborated in FIG. 2.2), allow users to create (including manually enter) transactions and process each transaction (at 23, and elaborated in FIG. 2.3), transmit (if needed) the output of that transaction to the messaging application installed on a recipient organization's transactional server (at 24, and elaborated in FIG. 2.4), provide the Unified Electronic Transaction Management System users with an array of online inquiry and reporting functions so they know the status of all transactions in real-time (at 25, and elaborated in FIG. 2.5), provide system security and logging capabilities to protect the Unified Electronic Transaction Management System's data and allow access of the data to the appropriate persons (at 26, and elaborated in FIG. 2.6), bill the Unified Electronic Transaction Management System users for the services provided and collect funds (at 27, and elaborated in FIG. 2.7), and de-provision any organizations that terminate their Unified Electronic Transaction Management System enrollment (at 28, and elaborated in FIG. 2.8).

Referring to FIG. 2.1 which elaborates the functional block 21 in FIG. 2, the invention is designed to allow organizations to enroll (at 211) and, unlike existing solutions that utilize EDI or proprietary networks, install the messaging application 12 by themselves without the need for any development by technology professionals. An organization manager visits a website managed by the remote server 14 and enrolls (at 211) their organization, entering information such as, but not limited to, their organization name and physical address, organization logo (though an upload of a graphic file), web domain name, information required to properly validate the organization in the validation process (see below), billing and payment information, and transactional systems and versions utilized by manually entering data or uploading files containing that information into a series of web pages on the remote server.

In an embodiment, the present invention uses the fact that it has a centralized database across all organizations to verify key master data (at 215) when a new organization is onboarded or when an organization adds a new supplier or customer. It is quite common that master data for suppliers and customers (e.g., organization name, address, phone, email, tax ID numbers) in a transactional system has errors or is out of date since it is usually updated manually. By comparing this master data with data about those same customers or suppliers already enrolled in the Unified Electronic Transaction Management System, this master data can be corrected automatically or with approval. This also prevents fraud since the addresses that checks or the bank accounts' electronic payments are sent to are critical. In an embodiment, the Unified Electronic Transaction Management System also keeps track of the financial entities and physical locations (at 215) of each organization (including location identifiers such as store numbers), which is critical to routing transactions for approval, assigning general ledger coding, and other tasks. The prior art does not have this capability because it does not include processing of transactions in its scope.

Once the organization enrolls (at 211), they need to go through a validation process (at 212) to ensure that the organization is who they say they are. Given the risk of fraud on the internet, this validation process has to be comprehensive, asking the organization for specific information to validate them, similar to the process a bank goes through when opening an account for a new customer. This validation process can occur at any time, as one embodiment of the invention tags all transactions (e.g., at 233 in FIG. 2.3) with a provisional status until the validation process is complete. Part of the validation process involves human beings, although much of it is automated.

Once the organization completes the enrollment process, it needs to establish communication between the organization's transactional system(s) 13 and the remote server 14. If the system identified during the signup process (at 211) is a cloud-based (online) transactional system 13 such as QuickBooks Online or Intacct, the organization enters appropriate information (at 213) to allow the remote server 14 to communicate electronically via remote access with the online transactional system 13. In this case, many of the functions of the messaging application 12 are resident on the remote server 14 since many cloud-based transactional system 13 vendors will not want the messaging application 12 downloaded onto their cloud-based transactional system server 13'; for purposes of discussion, when the messaging application 12 is mentioned it can be resident on the transactional system server 13' or not, as needed. For cloud-based transactional systems 13, the remote server 14 communicates via existing application programming interfaces (APIs) established by the transactional system vendor. For server-based systems, the remote server 14 communicates with the server-based transactional system 13 through a proprietary messaging application 12 installed on the vendor's server for its transactional system 13 that hosts their transactional system; this application is designed specifically to communicate with the remote server. In an embodiment, the messaging application 12 is embedded in the cloud-based transactional system 13 via cooperation with the software vendor, so no installation is needed. If the APIs are not comprehensive to handle all required transaction types or database queries, in another embodiment, the remote server 14 during the onboarding process asks the organization to set up remote access via a user in the transactional system 13 used for screen scraping, that is, the process whereby the remote server 14 automatically logs on to the cloud-based transactional system 13 remotely and simulates a physical user, which allows it to both enter and receive transactions through the same web pages a physical user would access to enter and receive transactions.

If the transactional system 13 is resident on a server managed by the organization, the organization manager during the enrollment process 21 is instructed to download an application (at 213) onto their transactional system server 13'. This application, in an embodiment, once installed, searches the contents of the server for the transactional system(s) 13 identified earlier when the organization manager identified the transactional systems; if it finds other systems or versions than that previously identified, in one embodiment it asks the organization manager if it found the correct systems and versions. It then downloads a messaging application 12 specifically for that transactional system 13 and version and installs itself. In one embodiment, the messaging application 12 is signed to say that it belongs to the enrolled organization for security purposes. The messaging application 12 then goes through a series of tests to ensure it can communicate properly with both the transactional system 13 and the remote server 14. If it runs into issues, it walks the organization manager through steps to correct the identified issues.

Once the messaging application 12 is installed or a remote access connection has been made with the transactional application 13, the remote server 14 gathers data (at 214) required for the remote server 14 to perform its processing functions. For example, if the transactional system 13 is an accounting or enterprise resource planning (ERP) system, the messaging application uploads to the remote server 14 the chart of accounts and any and all data required. (The chart of accounts data is needed for system users to properly provide account coding on purchase requisitions/orders or invoices routed for approval on the remote server 14.) In one embodiment, the remote server 14 validates the uploaded data (at 215). For example, when uploading supplier information, it may notice that the tax ID number or the address for a supplier is incorrect and transmit a notification to the appropriate person in the organization to validate a correction. In an embodiment, all transmissions between the messaging application 12 and the remote server 14 are encrypted for security purposes.

Further configuration is required for the remote server 14 to properly process each type of transaction. How the transaction is processed depends on the type of transaction.

The remote server contains process maps and business rules (at 217) for each transaction type, with process options (at 216) established by each organization as well as parameters for processing in that organization's unique environment (at 214). The process maps, business rules, process options and organization-specific parameters together determine how a transaction will be processed. For example, if the Unified Electronic Transaction Management System is utilized by an organization that performs accounts payable (i.e., it receives invoices from its suppliers), it will utilize the accounts payable process map. There are numerous variations (known as process options 216) in how different organizations process their accounts payable. If the invoice has a purchase order associated with it, it may involve matching it with the purchase order and a receipt (known as a three-way match), or simply matching it to the purchase order (known as a two-way match), or a two-way match with online approvals using an organization-specific approval matrix and routing path maintained online in the remote server 14. If the invoice does not have a purchase order associated with it, it may be electronically routed for approval by the remote server 14 using the same approval matrix. All of these process options (at 216) are established by the organization during the onboarding process through a series of screens containing questions that guide the organization manager, utilizing best practice processes embedded as process maps (at 217) on the remote server.

During the enrollment process (and anytime thereafter), organization-specific information needs to be entered into various screens (at 214) on the remote server 14 to capture information such as the organization's approval matrix for transactions of all types, lists of system users, its W-9 form (if it is a US organization), and so on. In a series of embodiments, some of these settings are optional during setup and some can be learned by the Unified Electronic Transaction Management System. For example, the approval matrix in a large organization can be very complex and is not always defined very well down to the user level. In this case, the Unified Electronic Transaction Management System can learn the approval matrix and complete it automatically based on which users route invoices to others for approval. In a further embodiment, any learned rules can be edited by the organization (at 217) in case they are not correct since some users do not always follow the correct procedures.

At this point, the remote server 14 is ready to start receiving and transmitting transactions. Referring to FIG. 2.2 which elaborates the functional block 22 in FIG. 2, if the transactional system 13 is a server-based system, the messaging application 12 polls the transactional system 13 every few seconds or may receive transactions via the transactional system's API (at 221); when it sees that a new transaction has been created in the transactional system 13, it encrypts the transaction data and transmits it (at 222) via the internet to the remote server 14. If the transactional system 13 is a cloud-based system, the messaging application 12 either receives new transactions via an existing API (at 221) as they are created in the transactional system 13 or it may query the transactional system (at 224) for new transactions. In either case, the messaging application may perform screen scraping to find new transactions (at 225). The format of the transaction depends on the transactional system 13 and will vary depending on each system. The messaging application 12 will reformat (at 222) the transaction into a common format used by the remote server 14 and transmit it (at 223) to the remote server 14.

Referring to FIG. 2.3 which elaborates the functional block 23 in FIG. 2, once the remote server 14 receives the transaction data (at 231), it is saved (at 232) in the remote server database 17 and then processed by the remote server 14 (at 233). How it is processed depends on the process maps and business rules (at 217 in FIG. 2.1), process options chosen by the organization (at 216 in FIG. 2.1) during the onboarding process (at 21 in FIG. 2) and the business rules also previously defined or learned by the Unified Electronic Transaction Management System. For example, organization A (a customer of organization B) may create a purchase order in its transactional system 13 to be fulfilled by supplier organization B. Upon creation, the messaging application 12 "sees" that a new purchase order exists, converts the data to the Unified Electronic Transaction Management System's common format, encrypts it, and transmits all of the encrypted data associated with the purchase order to the remote server 14. The remote server 14 receives the transaction data and stores it in its database 17. Depending on the options chosen by organization B, the remote server 14 may then translate the purchase order into a preliminary sales order using a translation map of organization A's item numbers in their transactional system 13 to organization B's item numbers in their transactional system 13 and route the purchase order and sales order for approval using the approval matrix on the remote server 14 to the appropriate manager(s) at organization B.

The present invention also, in an embodiment, knows the incompatibilities between different transactional systems 13 and has built-in rules to handle these incompatibilities. For example, if organization A's transactional system 13 has a document number field with 25 digits but organization B's system's field has only 10 digits, how should this be handled? In a manual process, the person entering the document may truncate the document number. Rules such as this are built into the inventive system to prevent exceptions from stopping the process once it has been automated.

This again illustrates several important features that are lacking in the prior art. Most of the prior art does not envision processing of transactions (as is processed at 23 in FIG. 2), only sending them between sources and recipients. However, transactions that are sent electronically need to be processed; for example, one organization can send another organization a payment, but the recipient needs to enter it into their accounting transactional system 13 and apply it to the proper invoice to relieve the outstanding invoice balance. The present invention uses the data from both organizations' transactional systems 13 to fully process the transactions. In the above example, since the remote server 14 received the payment transaction from the transactional system 13 or can query it from the transactional system 13 as needed, the remote server 14 knows which invoices a customer is paying with a given payment and automatically applies the payment to the proper invoices in the supplier's accounting transactional system 13. Some of the prior art discussed specific use cases such as workflow approval of invoices, but none of the prior art has a general-purpose system that contains process maps for many transaction types and uses process-specific options and both organizations' data, so they can be fully executed on an automated basis.

Furthermore, the present invention utilizes machine learning (at 234) to capture data and learn how to automatically process a given transaction if it cannot otherwise process it. In this case, the Unified Electronic Transaction Management System routes transactions to specific personnel at the appropriate organization to allow them to complete the transaction manually. The Unified Electronic Transaction Management System learns this organization-specific data (at 234) and executes the process on an automated basis the next time that type of transaction with that specific data set is processed (at 23 in FIG. 2). An example of this was mentioned above where the Unified Electronic Transaction Management System learns who needs to approve certain transactions as they are manually routed using the Unified Electronic Transaction Management System's workflow capabilities and approval matrix. The Unified Electronic Transaction Management System also allows users to edit this organization-specific data (at 238) to ensure the next time a transaction is processed automatically it will be processed correctly.

Not all transactions are processed without issues. Depending on the organizations involved, anywhere from 10% to 50% of all transactions have what are known as exceptions. Exceptions are anything that prevents the transaction from being completed. These often take a very high level of effort to correct. An example would be the case where the price on the purchase order and the price on the invoice are different. Since the organization ordering the item expects to pay one price but received an invoice for a different price, this needs to be resolved before an invoice can be processed. Organizations generally resolve these issues through phone calls and emails, which are slow and time-consuming. In addition, a written record of how the issue was resolved and its history, which is often critical for proper record keeping, is saved in media that are nowhere to be found when one researches the transaction in the transactional system.

One of the key features of the invention is that it helps the users of the Unified Electronic Transaction Management System with transaction processing. In this regard, once an exception has been identified, the Unified Electronic Transaction Management System utilizes a combination of workflow routing and messaging (at 235) to assist the Unified Electronic Transaction Management System users in resolving issues. In the example above, if there was a discrepancy between prices on the purchase order and invoice, the proper purchasing manager at the organization that issued the purchase order would be notified of the exception via a text, email or other form of messaging from which they could click on a link and, once logged in to the remote server 14, view both documents and their respective transaction history and propose a resolution from a drop-down or similar list. This proposed resolution, if needed, could be routed electronically (at 235) to the proper manager at the other organization and, once accepted, the proper transaction would be executed, allowing the problem to be resolved. So in this example the purchasing manager may realize the purchase order had the wrong price and the Unified Electronic Transaction Management System would prompt the purchasing manager to issue a revised purchase order with the correct price. This would be sent to both organizations' transactional systems 13 via the messaging application 12 and then the remote server 14 would complete the purchase order to invoice match and, through the messaging application 12 transmit the completed transaction to the transactional system 13.

In one embodiment of the invention, the remote server 14 allows organizations to reference specific transactions and transmit secure messages (at 236) to one another through the remote server 14 so they can work together to resolve outstanding issues. Security is critical because these are often financial transactions that contain sensitive information. The remote server 14 allows organizations to set up various mechanisms to communicate, some at the organization level and some at the user level. All communications are stored and searchable (by transaction or content) for future reference.

A significant problem with the prior art is that both parties to a transaction do not have visibility into the status of that transaction though all of its different phases. As mentioned previously, transactional systems 13 are currently islands of automation that correspond mainly via paper or digital format or renditions of paper documents. Even if they correspond via EDI, one organization's system does not know the status of the transaction at the other organization; EDI is simply used as a way to send the paper in electronic form. The present invention overcomes this issue by enabling both parties to view the status of the transaction in real-time through all of its phases in both a series of screens and reports (at 25 in FIG. 2). Was the transaction sent? Was it received? Was it processed? Were there any exceptions? What was the outcome of the transaction? This visibility prevents the initiation of emails and phone calls to track transaction status, which typically consumes 20% to 25% of time by personnel involved in the process. The same screens and reporting modules in the present invention allow organizations to view the status of each transaction and the entire transactional processes in real-time (at 25 in FIG. 2).

Where organizations have implemented solutions such as EDI, since they are custom-developed technology solutions, they often suffer from software bugs and other maladies. Duplicate transactions are a common problem for both parties in a transaction. The present invention overcomes this issue, in an embodiment, by keeping track of transactions sent and also checking for duplicate transactions (at 239) using sophisticated algorithms that detect and eliminate duplicates at the source. This process also identifies transactions that may be missing from one transactional system or another (at 224) through a series of queries. If a missing transaction is identified, the messaging application will transmit that transaction to the remote server 14 for processing, ensuring no transactions are missed by either party to that transaction.

Most transactions have a recipient. Referring to FIG. 2.4 which elaborates the functional block 24 in FIG. 2, If a specific transaction has a recipient (at 241) (for example, a purchase order needs to be received by a supplier from its customer), the remote server 14 encrypts the transaction (at 243) and transmits the transaction (at 244) to the intended recipient via the messaging application 12 resident on the recipient organization's transactional system 13. The messaging application 12 receives the transaction data in the Unified Electronic Transaction Management System's common format, converts it into the specific format (at 124 in FIG. 3) used by the recipient organization's transactional system 13, and transmits that transaction data (at 123 in FIG. 3) into the recipient organization's transactional system 13. The process for that transaction is then complete. In the example above, once the purchase order and sales order from organization A is approved, the new sales order transaction is sent from the remote server 14 to organization B's messaging application 12 which in turn creates a new sales order transaction in organization B's transactional system 13.

The invention has an embodiment that utilizes the data it has on each organization to pre-verify transactions (at 242) before they are sent, preventing errors and disputes. For example, with the prior art if an invoice is received by an organization and it has pricing that does not match the purchase order associated with it, exception(s) will be generated, and a dispute process will ensue that is time-consuming for both parties. With the present invention, however, if organization A generates an invoice to organization B, the Unified Electronic Transaction Management System verifies that the prices for the items on the invoice match what is on the associated purchase order before the invoice is sent. If it detects a discrepancy, the Unified Electronic Transaction Management System can (depending on organization-specific options) route that invoice to the appropriate manager at organization A to potentially fix pricing on the invoice before it is sent.

Some organizations may be concerned that the messaging application 12 and the remote server 14 will capture sensitive or proprietary information outside of the transactions discussed. To help organizations understand the actual data retrieved from their system, in an embodiment, the remote server 14 has online inquiry screens and reports (see 25 in FIG. 2, and FIG. 2.5) that allow organizations to monitor and audit in real time the data retrieved and stored on the remote server 14 to give them comfort that only the data they authorize is being retrieved and stored.

Referring to FIG. 2.5 which elaborates the functional block 25 in FIG. 2, the Unified Electronic Transaction Management System provides system users with an array of online inquiry and reporting functions, so they know the status of all transactions in real-time. For user inquiries, at 251, a system user selects inquiry pages from a menu. At 252, the system displays appropriate inquiry screens and accepts user data parameters. For reporting, at 253, the system user selects report lists from menu; at 254 the system accepts appropriate user data parameters for the given report and displays the user designated report at 255. The remote server 14 therefore allows an organization to inquire regarding all aspects of each transaction through built-in dashboards, screens and reports.

Referring to FIG. 2.6 which elaborates the functional block 26 in FIG. 2, the Unified Electronic Transaction Management System provides system security and logging capabilities to protect system data and allow access of the data to the appropriate persons. Because the Unified Electronic Transaction Management System contains sensitive financial data, security of that data is of the upmost importance. To that end, the remote server 14 encrypts the entire database and all transactions sent or received as discussed earlier. In addition, the remote server 14 allows system users to select a comprehensive list of security options for who can view, add, change or delete transactions. For example, at 261, the system displays security options to a system administrator, and the system accepts revised security options from the system administrator at 262.

Referring to FIG. 2.7 which elaborates the functional block 27 in FIG. 2, the Unified Electronic Transaction Management System also contains functionality to both bill and collect system users that utilize it. Users can select how they want to be billed (at 271). Based on usage for the prior billing period, the system will calculate a bill (at 272), process it and transmit it (at 273) to the organization's transactional system 13 (if it is an accounting transactional system) through the messaging application 12. The Unified Electronic Transaction Management System has a collections module that will create an ACH debit transaction or credit card transaction (at 274), depending on system user selection.

Referring to FIG. 2.8 which elaborates the functional block 28 in FIG. 2, if an organization decides to stop using the Unified Electronic Transaction Management System, a manager at the organization can complete a web page (at 281) on the remote server 14, select options (at 282) for deprovisioning such as what to do with the data that the system has, and the system will deprovision the organization (at 283) from the system.

Messaging Application (12)

Since the messaging application 12 is tightly coupled with the remote server 14 and, in fact, both need to function to achieve the desired result and overcome the limitations of the prior art, the relationship between the two was discussed in some detail in the description of the remote server 14 above.

Figure 4:
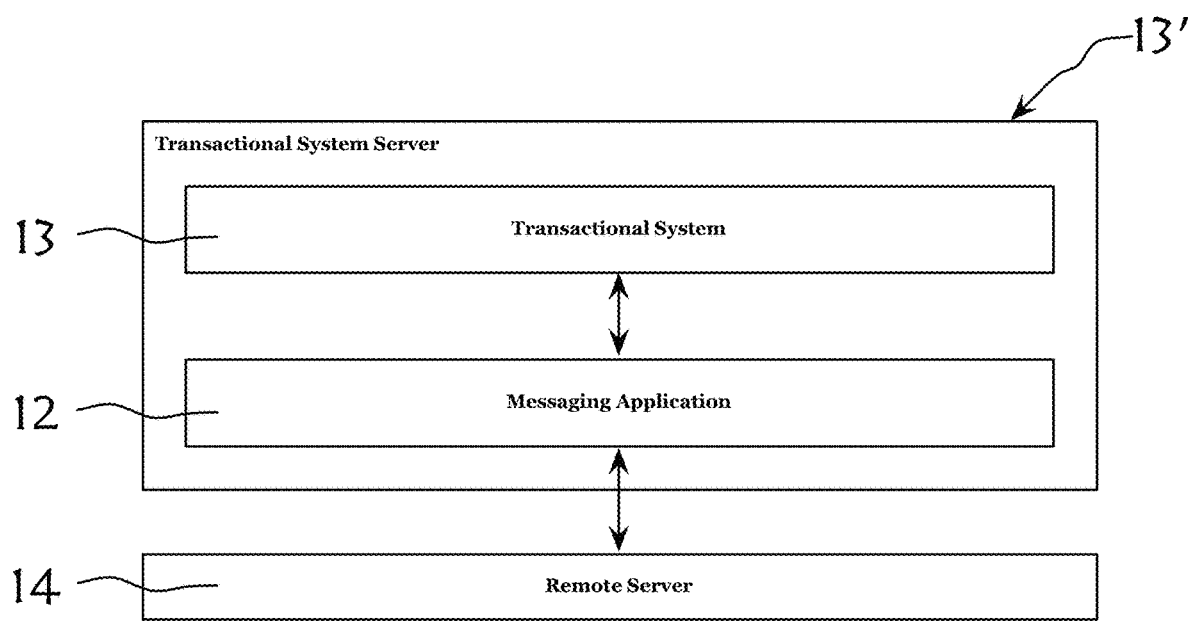
FIG. 4 is a schematic diagram depicting a messaging application residing on a server that runs the transaction system, in accordance with one embodiment of the present invention.

For server-based transactional systems 13, the messaging application 12 is installed by an organization during the onboarding process (at 21 in FIG. 2; 213 in FIG. 2.1), as mentioned above. It is downloaded from the remote server 14 and is signed, identifying the organization that downloaded it for security purposes, so any transactions from the messaging application 12 are secure. In addition, it has built-in encryption, so all messages sent from the messaging application 12 are encrypted with a key known only to the remote server 14. As shown in FIG. 4, the messaging application 12 sits on the server 13' that runs the transactional system 13, communicating with both the transactional system 13 and the remote server 14.

Referring to FIG. 2.1.3, during the onboarding process, the organization manager enrolling identifies (at 2130) the transactional system(s) the organization utilize(s), the version numbers and whether they are server-based or cloud-based (at 2131) on a series of web pages. If the transactional system 13 is cloud-based, the messaging application 12 does not need to be installed but instead the messaging application 12 on the remote server 14 needs to be configured (at 2138) for remote access into the cloud-based transactional system 13. This is comprised by providing a user ID and password and typically validating or providing an Internet Protocol (IP) address or website Uniform Resource Locator (URL) that contains the location of the cloud-based system. The remote server then tests to ensure that it can successfully logon to the cloud-based application (at 2139).

If the transactional system 13 is server-based, the remote server 14 will sign an installation program (at 2132) (which identifies the organization that the messaging application 12 will belong to) and then allow the organization manager to download (at 2133) that program into their transactional system server 13' and install it. Once installed, it runs and initially verifies the transactional system and version (at 2134) previously identified by the organization manager during the initial part of the enrollment process (at 2130). If it finds a different transactional system 13 or version, the organization manager must resolve the conflict. It then installs (at 2135) the appropriate plugins for that particular transactional system 13 and version on the transactional system server 13'. The installation program may include a library of plugins for various transactional systems, or the appropriate plugins may be downloaded from the remote server 14, or another server, which maintains a library of plugins for various transactional systems. The organization manager then provides the messaging application 12 with access to the transactional system 13 screens and APIs by providing a user ID and password and other credentials via a series of web pages (at 2136). The messaging application 12 next tests connectivity (at 2137) to the remote server 14 by transmitting messages back and forth; if it cannot connect properly, it walks the organization manager through a series of steps to resolve the issue. Lastly, the messaging application 12 executes a series of test transactions (at 2140) with the transactional system 13 and the remote server 14 to ensure that all transactions can be transmitted and received as expected. If there is an error, the organization manager is instructed to contact a support person to help determine the problem.

If the transactional system 13 is a cloud-based application such as QuickBooks Online, the messaging application 12 is resident on the remote server 14. If the cloud-based transactional system 13 vendor allows it, in another embodiment, the messaging application 12 can be installed on the cloud-based transactional system 13 vendor's server. In a different embodiment, the transactional system 13 software developer may embed the messaging application 12 in their software, so system users do not need to install a separate messaging application 12.

Figure 3:
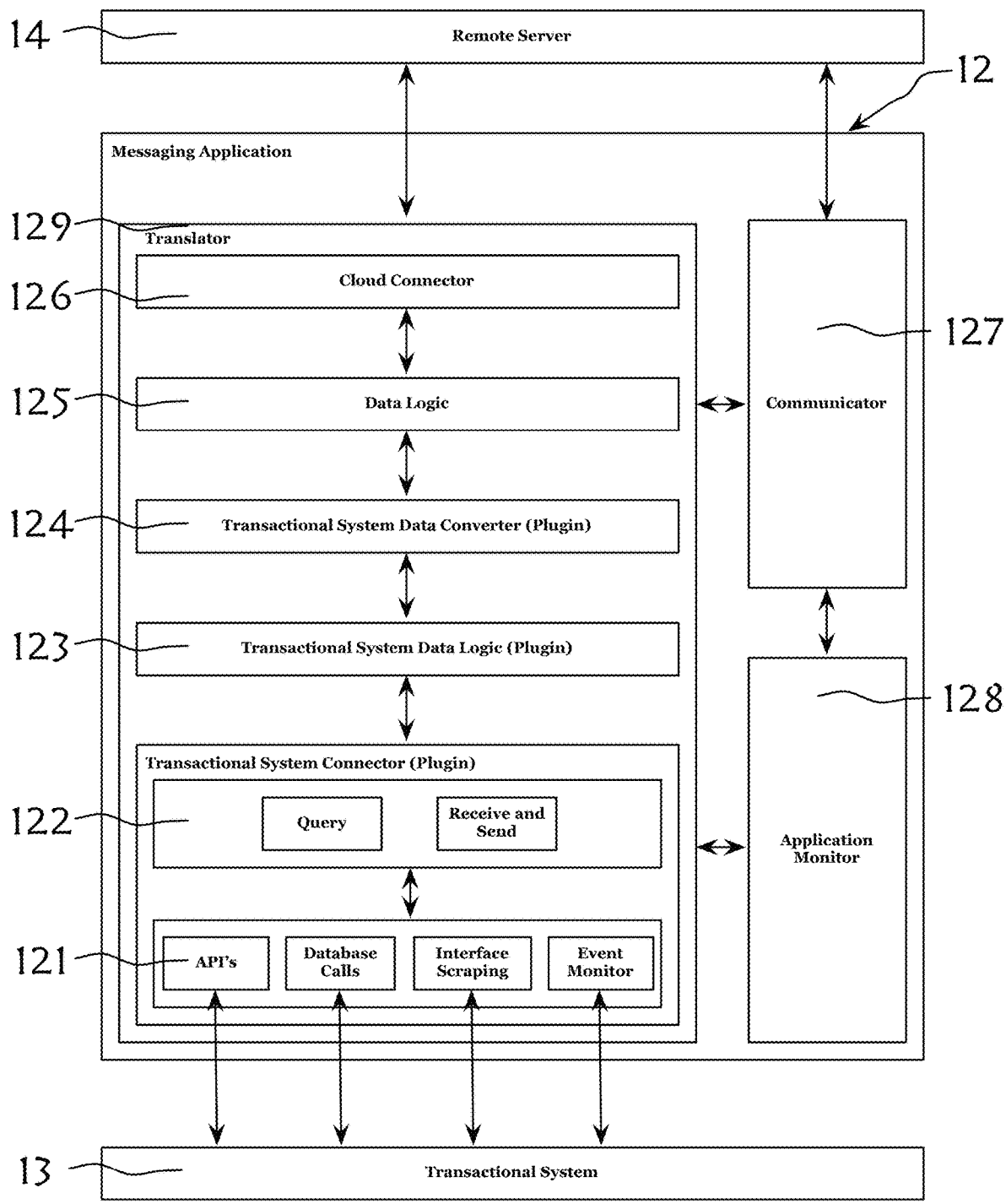
FIG. 3 is a schematic diagram illustrating the functional components comprising the messaging application, in accordance with one embodiment of the present invention.

Referring to FIG. 3, the messaging application 12 consists of three main components: a translator 129 responsible for moving data to/from the transactional system, executing rules on said data before/after the data is sent/received from the tractional system specific to that transactional system, converting said data to/from a standard format for that specific transactional system, executing rules on the data to get it ready for any transactional system, and a cloud connector that communicates with the remote server securely, an application monitor 128 that ensures the messaging application is running smoothly including logging activities in case there are problems that need to be resolved remotely, and a communicator 127 that talks to both the application monitor and the translator and sends alerts if there is a problem with the system, as well as communicates with the remote server 14. For security purposes, the messaging application 12 does not store any transactional data on the transactional system server 13' long-term, but rather only until it can transmit the data to the transactional system 13 or the remote server 14 as needed.

The messaging application 12 connects to the remote server 14 using the cloud connector 126 component of the translator. In an embodiment, it connects via an embedded HTTP server with a REST API. When a command needs to be sent to the messaging application 12, the remote server converts any required data to a specific format for transmission such as JSON format, stores it in the body of a request such as an HTTP request, and issues the appropriate call (such as a REST call (via HTTPS)) to the appropriate messaging application 12 at the desired transactional system server 13' (this is for transactional systems that are running on a local transactional system server; the messaging application 12 for cloud-based systems can run on an organization-located server or a cloud-based server (including the server used by the cloud-based transactional system), potentially co-located with the remote system servers for improved performance). As soon as it receives the command, the cloud connector 126 deserializes the embedded data and passes it to the data logic 125 component in the messaging application's translator 129.

The data logic component 125 is a preprocessor for the data that applies any general logic necessary to get it ready for use with any transactional system. In an embodiment, this includes authenticating the user who sent the command to ensure that it should be executed. Once the preprocessing is complete, the command is passed to the transactional system data converter component 124.

It is important to note that the next three components, all of which are specific to the type of transactional system being used, are implemented as plugins to the rest of the messaging application 12. This means that they can be dynamically downloaded and loaded into the application according to the type of transactional system. In fact, the messaging application 12 is designed to do just this right after installation; it will scan the transactional system server it is installed on, look for the type of transactional system being used, and download the latest version of the plugins for that transactional system. Upon subsequent launches it will check for updated versions of the plugins and can update itself automatically to the latest versions. Note that the system has a vast library of plugins for many different transactional systems.

The first plugin, the transactional system data converter 124, takes the command data (which is still in the common data format at this point utilized by the remote server) and converts it to the appropriate format for the local transactional system 13. After conversion it passes the command to the transactional system data logic plugin 123.

Just like the data logic component 125, the transactional system data logic plugin 123 is a preprocessor for the data, this time applying any logic that is specific to the transactional system 13 being used. This includes checking each of the required fields in the data to make sure they are complete and moving data between fields where necessary to match the specific transactional system's 13 requirements. Once done, it passes the data to the appropriate command method in the transactional system's connector plugin 122.

This final plugin, the transactional system's connector plugin 122, contains the logic to connect to the transactional system 13 and make the call that executes the command. Depending on the transactional system 13, this may be done through either direct or REST API calls, direct calls to the transactional system's 13 database, or through interface scraping if necessary 121. Depending on the needs of the remote server 14, it may send or receive transactions to or from the transactional system 13 or may query the transactional system for specific data it needs 122. If the result of this call is a success, the plugin calls the communicator component 127 of the messaging application 12 to have the call logged. The success message and any accompanying data then takes the same path backwards through the translator 129 plugins and components to be sent back to the remote server 14 for appropriate action. The same process is followed if the result of the original call to the transactional system 13 is an error, only the communicator component 127 will also alert an administrator if needed. So regardless of success or failure, the messaging application 12 responds back to the remote server 14 to indicate that final status of each command. This allows the cloud service to issue rollback commands if needed and also to report command status back to each organization utilizing the system. The communicator component 127 is responsible for all non-transaction activities including any alerts.

Note that the messaging application 12 also includes an application monitor component 128, which is responsible for making sure that the messaging application 12 is running smoothly and that any maintenance-type chores are executed properly. The messaging application 12 runs as a service (such as a Window service), and in an embodiment includes a companion taskbar application that provides a visual indicator of the messaging application 12 health and is able to restart the messaging application 12 if it stops responding for any reason. It also contains various settings required for the messaging application 12 to operate smoothly in its environment, such as port settings so it can communicate with the remote server 14. If communication is lost between the remote server 14 and the messaging application 12, in an embodiment, the appropriate person from the organization that owns the transactional system 13 is sent messages from either the remote server or the messaging application 14 communicator module 127 notifying them of the issue so they can correct it. (In the meantime, any transaction data that needs to be sent is queued until the connection is reestablished.) Once the messaging application 12 receives a transaction, it transmits it to the transactional system 13 or to the remote server 14 as appropriate.

As transactions are received or sent, they will be queued on the remote server 14 for processing and managed using technologies such as Apache Kafka that ensure that the Unified Electronic Transaction Management System does not lose transactions and maintains integrity of these transactions.

Due to frequent changes and enhancements, the logic behind the messaging application 12 will need to be updated frequently. The architecture as such will ensure that most of the processing logic is on the remote server 14 so that the messaging application needs to be updated as infrequently as possible. However, when it does need to be updated the messaging application 12 is able to automatically update itself where possible or notify the appropriate person at the organization to perform a manual update 12 through a common process when needed.

Transactional System Server

Organizations' transactional systems 13 can take many forms. As mentioned previously they can be server-based (see, e.g., FIG. 4) or cloud-based. The servers themselves can operate on a variety of platforms such as Windows, Linux, As/400 or others. In larger organizations, the infrastructure may be quite complex, spanning multiple servers, databases and data centers. As such, the messaging application 12 is available in a variety of versions so that it can operate in almost any environment.

Database (17)

The remote server's database 17 stores all of the data associated with each transaction, as well as the process options, business rules, organization-specific data and logs associated with the processing of transactions. In an embodiment, all data and document images are encrypted for security purposes. The database 17 may be located with the remote server or in an embodiment, in a separate location, accessed via the internet.

In many transactional processes knowing the status of each transaction and being able to pull up the transaction for viewing is critical to the smooth operation of an organization's business. The remote server 14 therefore allows an organization to inquire regarding all aspects of each transaction through built-in dashboards, screens and reports (see 25 in FIG. 2 and FIG. 2.5). The database itself is able to be queried to a limited extent (an organization may only make queries regarding its own transactions and data, for example) using built-in APIs.

External Electronic Transactions (at 15)

Some organizations may not wish to install the messaging application 12 on their server for a variety of reasons. They may use some other method to communicate electronically with other organizations or may have a custom transactional system 13 where it does not make sense to build a version of the messaging application 12, but they wish to transmit transactions through the remote server 14 to organizations that use it or may wish to receive electronic transactions from organizations that use the remote server 14.

In this case, in an embodiment, these organizations may use published APIs that allow them to transmit and receive transactions with all of the organizations using the Unified Electronic Transaction Management System.

External Non-Electronic Transactions (at 16)

If an organization does not have the messaging application 12 installed, electronic communications of transactions will not be possible. In this case, the Unified Electronic Transaction Management System is able to transmit and receive transactions through other methods in use in the prior art including email, mail, fax and other methods. This includes the ability for the system to allow manual entry of transactions via web pages including the system users to attach document images to said transactions. The Unified Electronic Transaction Management System supports this so that all of an organization's suppliers and customers can be included in the Unified Electronic Transaction Management System for processing and an organization can have all of its transactions in one place. This includes data-entry screens for specific types of transactions including Optical Character Recognition (OCR) software built-in to the screens that also allow for manual validation of OCR data.

Third Party Applications (18)

The remote server 14 is also a platform that allows third-parties to provide services and applications 18 that enhance its capability. For example, a third party may have a database of sales-tax rates and can offer an application on the remote server that validates the sales-tax rates on any transaction (purchase orders, invoices, etc.). In an embodiment, the remote server 14 will allow third-parties to write applications that work on the remote server 14 to allow such services.

Example

A real-world example will help understand how this invention overcomes the prior art. Organization A is a small organization supplying ingredients to organization B, a large organization that manufactures food products. While organization B has an EDI program in place, organization A was never able to use it because its accounting transactional system 13 does not have EDI capability. Due to the need to buy expensive EDI software and to use expensive technology personnel to configure it and write programming code to make it all work, adopting such a program did not make financial sense for organization A.

So organization B sends its purchase orders to organization A as PDFs via email and a staff person at organization A takes each purchase order and manually enters it into their accounting transactional system 13, manually translating each line item from organization B's item number to organization A's item number. Organization A prints a bill of lading from its accounting transactional system 13 and includes it with the shipment of goods. An invoice is also generated as a separate PDF and emailed to organization B. When the goods are received, organization B manually enters receipt information into their inventory transactional system 13 (which is different from their accounting transactional system 13) including received quantities for the shipment received at the loading dock. Organization B then manually enters the invoice into their accounting transactional system 13 and manually performs a three-way match again the purchase order, receipts and invoice.

In doing the match, the accounting clerk at organization B sees that the price for one of the line items is different from what was on the purchase order and has to make a phone call to the accounts receivable clerk at organization A to let them know of the issue. After checking internally with the billing department, the accounts receivable clerk at organization A is told that the invoice went out with the wrong price and they will be sending a credit memo for the correct amount. Several days later, the accounts payable clerk at organization B receives the credit memo via email and is able to complete the three-way match in their transactional system 13 and the invoice is now processed. In organization B's accounting transactional system 13 the invoice is now scheduled to be paid according to the payment terms in their accounting transactional system 13. Organization A sends its payments and remittance information to organization B via paper check, which organization A has to deposit at their bank and then manually enter the remittance information into its accounting transactional system 13 to apply the cash received to the appropriate open invoices. The process is now complete (assuming that no errors were made as a result of all the manual input and potential confusion).

When both organizations use the present invention, the process becomes fully automated. Referring to FIG. 2.2, organization B creates purchase orders in its accounting transactional system 13 (e.g., as it always has, through an automated process that replenishes its inventory) and once created, the messaging application 12 will see that a new purchase order transaction has been created (at 221), encrypt and format the purchase order data (at 222) and transmit it (at 223) to the remote server 14 (in the Unified Electronic Transaction Management System's common data format).

Referring to FIG. 2.3, the remote server 14 receives the purchase order transaction (at 231), stores it (at 232) in the database 17, and checks for duplicate transactions (at 239). It then processes the transaction (at 233) using the process maps and business rules (at 217 in FIG. 2.1), process options (at 216 in FIG. 2.1), and organization-specific data (at 214 in FIG. 2.1) set up in the remote server 14. In this case, it processes the transaction (at 233) by creating a PDF representation of the paper purchase order using a format designed by organization B. It then converts the purchase order to a sales order, converting each line item using the organization-specific mapping rules on the remote server 14 that it learned (at 234) when earlier transactions were manually processed in the Unified Electronic Transaction Management System. However, one of the item numbers has not been seen before and so the purchase order transaction is electronically routed (at 235) to a customer service agent at organization A. The agent determines that the item is an item that this customer has never ordered before and maps it (at 234) to the correct item in their product catalog on a screen generated by the remote server 14 just for this purpose. Once complete, the remote server 14 generates (at 233) a proposed sales order transaction including a PDF representation of the paper sales order in the format specified by organization A earlier on the remote server 14. The sales order is routed (at 235) by the remote server 14 to the appropriate customer service agent for approval. Referring to FIG. 2.4, once approved, the remote server 14 encrypts the sales order transaction (at 243) and then transmits it (at 244) to the messaging application 12 resident on the accounting transactional system 13 used by organization A. The remote server 14 also transmits a purchase order acknowledgment transaction to the appropriate person at organization B, who receives a notification of such; at this point there is no need to do anything more.

When the goods are ready to be shipped from organization A to organization B, the accounting transactional system 13 creates a bill of lading. Referring to FIG. 2.2, the messaging application 12 sees this new transaction (at 221), formats and encrypts it (at 222) and transmits (at 223) this bill of lading and the bill for the goods to the remote server 14. Simultaneously, the accounting transactional system 13 creates an invoice which is also transmitted in the same way as the bill of lading above. When the remote server 14 receives from the messaging application 12 the bill of lading and the bill for the goods (now an invoice for organization B), it puts them on hold because the goods have not been received yet (i.e., there was not a corresponding receipt traction received by the remote server 14). Referring to FIG. 2.3, When the goods arrive, the receiving clerk on organization B's loading dock logs on to the remote server 14 and views a proposed receipt (at 233) for all of the goods in the shipment. The clerk looks at the shipment, makes sure the goods are not damaged, counts the goods to verify that the quantity shipped was what was on the bill of lading, and accepts the receipt on the remote server 14. However, the bill of lading showed that one fewer unit of one of the items was shipped than what was ordered. The remote server 14 sends an automated message (at 235) to the accounts receivable clerk at organization A informing them of this fact, who determines that it doesn't make sense to ship one more unit due to the small cost of the item. Using the remote server 14 to send messages back and forth (at 236), both clerks agree to this and the purchase order and sales order are both marked as complete.

Once the goods have been received, the messaging application 12 receives the receipt transaction and transmits it to the remote server 14 which performs an automated three-way match of the purchase order, receipt and invoice, taking the one unit short into account (at 233). The payment is then scheduled by Organization B's accounting transactional system 13. On the day of payment, the payment is sent via the preferred method (and an electronic version to the remote server 14 via the messaging application 12) and an electronic remittance advice is automatically applied to the outstanding invoice (at 233) by the remote server 14 and the cash application transaction is transmitted by the remote server 14 to Organization A's accounting transactional system 13 via the messaging application 12. Since organization A set a process option (at 233) on the remote server 14 to only route exceptions (at 235) to a clerk, it is recorded automatically. The process is now complete.

Differences from the Prior Art

There are numerous differences between this invention and the prior art. One key component of the invention is the messaging application 12, a universal application that installs on any transactional system server 13' and downloads any plugins it needs for a specific transactional system 13. Crucially, the messaging application 12 uses multiple methods to pull data from and send data to any transactional system to overcome limitations of the prior art and work universally on all transactional systems. The prior art assumes that data can be extracted from and sent to a transactional system 13 using commonly available interfaces or APIs, however such interfaces are only available for selected transactional systems 13 and for only a limited set of transaction types. Within this, some operations (such as adding, modifying or deleting a transaction) are commonly not available for certain transaction types. The present invention can use these existing APIs but also make both database calls and scrape data from screen interfaces (at 121 in FIG. 3) when such APIs are not available, overcoming such limitations. In addition, few transactional systems 13 send out events, or again only do so for a subset of transaction types, which are notifications that a transaction has been created, modified or deleted, so it is critical to monitor the transactional system to see if transactions have happened. The messaging application 12 monitors for events as well using the event monitor that subscribes to and listens for any events if the transactional system supports such events (at 121) but also critically interrogates the transactional system 13 to identify new or modified transactions.

Note that the messaging application itself is not an API. An API is a method (not an application) that is part of a transactional system, by which an external software can send or receive transactions to that transactional system; APIs are always built and offered by the software developer of the transactional system as a means for external parties to access their system. The messaging application is instead an independent application that may utilize an existing API, may utilize database calls, or may utilize interface scraping or other methods to accomplish its objectives of sending transactions to and receiving transactions from the transactional system.

Since the prior art assumes use of existing APIs, one has to engage with software developers to build applications that extract data from these APIs and send it somewhere. The present invention eliminates the need for technology professionals' involvement as it self-installs on any transactional system, or in the case of a cloud-based system, works without installation. It handles all of the back-end work of extracting and sending the data for all transaction types.

Since some custom software development is required for the prior art, those solutions assume that the data should be sent to someone and usually using FTP or some other protocol and method. The present invention authenticates the organization before sending data to ensure they should receive it. It also automatically encrypts the data for security purposes. All of this has to be manually handled through software development using the prior art.

As mentioned above, the prior art is concerned with taking data from one transactional system, converting it, and sending it to another transactional system using established APIs. It assumes the other transactional system can process these transactions. This is sometimes true for some transactional systems and only for some transaction types, but not true for a majority of transactional systems. For example, of the hundreds of different accounting systems in existence, only a handful of them can perform an automated three-way match of a purchase order, receipt and invoice.

The inventive remote server 14 has this functionality built-in; in other words, it actually processes transactions before sending them to the transactional system. Furthermore, it utilizes the data in transactional systems by both parties to a transaction to properly process these transactions using pre-established process maps (at 217) and organization-specific process options (at 216). To continue with the above example, the remote server 14 knows what items were shipped from the bill of lading and can notify the receiving department of an organization if the recipe of the goods differed from what was shipped to help eliminate any matching discrepancies. The prior art does not utilize the data from both transactional systems to process transactions using built-in process maps with process options, nor does it identify and help eliminate process issues. This, combined with the messaging application that provides the remote server with its data, is truly revolutionary and allows entire business processes for all utilized transaction types to be fully automated for any organization which is impossible utilizing the prior art without extensive and costly custom software development.

There are numerous other unique aspects of the present invention that differ from the prior art. The remote server is a platform that allows external electronic and non-electronic transactions to be received by it. The prior art does not contemplate a centralized remote server that manages the entire transactional processes and allows external sources of data. Furthermore, it allows for third party applications to run on the remote server.

The process and system of the present invention has been described above in terms of functional modules in block diagram format. It is understood that unless otherwise stated to the contrary herein, one or more functions may be integrated in a single physical device and/or software module in a software product, or one or more functions may be implemented in separate physical devices and/or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules, hardware and software components in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. For example, the various electronic form applications can be easily modified to incorporate different or additional processes to provide additional user flexibility in connection with creating and managing electronic forms and form information. Accordingly, it is to be understood that the invention is not to be limited by the specific illustrated embodiments, but only by the scope of the appended claims.

I claim:

1. A unified electronic transaction management system that manages electronic transactions relating to a commercial transaction between a first transactional system and a second transactional system over a network, comprising:
a first messaging application interacting with the first transactional system that operates on a first transaction data in a first data format, wherein the first messaging application converts the first transaction data between the first data format and a common data format;
a second messaging application interacting with the second transactional system that operates on a second transaction data in a second data format, wherein the second messaging application converts the second transaction data between the second data format and the common data format, wherein the common data format is different from the first and second data formats;
a remote server comprising a processor and a memory containing a set of rules and process maps relating to electronic transactions and interacting with the first messaging application and the second messaging application over the network, wherein the remote server including an application service receiving and processing in accordance with the set of rules and process maps the converted transaction data in the common data format converted by the first and second messaging applications, and forwarding respective processed converted transaction data in the common data format to the first and second messaging applications; and
a database associated with the remote server, storing the converted transaction data received by the remote server and processed converted transaction data and other data related to processing of the electronic transactions, wherein the first messaging application extracts and converts the first transaction data in the first data format received from the first transactional system into a first converted transaction data, the second messaging application extracts and converts the second transaction data in the second data format received from the second transactional system into a second converted transaction data, and the first messaging application and the second messaging application respectively forward the corresponding converted transaction data in the common data format to the remote server, wherein the respective first and second messaging applications receive and convert the processed converted transaction data in the common data format received from the remote server into corresponding first and second transaction data in the corresponding first and second data format, and loads the corresponding first and second transaction data in the corresponding first and second data formats converted from the processed converted transaction data into the respective first and second transactional systems, wherein the remote server utilizes the converted transaction data received from both the first and second transactional systems to process the electronic transactions, including further querying via the corresponding first and second messaging applications of both the first and second transactional systems to identify any transaction that is missing from either the first transactional system or the second transactional system, wherein the remote server extracts the missing transaction from the database in the common data format and forwards to the first or second messaging applications associated with the corresponding first or second transactional system that is missing the transaction, and wherein the remote server verifies in a verification process new electronic transactions utilizing data in the database obtained from both the first and second transactional systems, wherein mismatches of data concerning a transaction determined by the verification process are routed to appropriate system user(s) to approve, reject or modify such transaction before they are sent by the remote server to the messaging application of an intended receiving first or second transactional system.

2. A unified electronic transaction management system as in claim 1, wherein the remote server processes in accordance with the set of rules and process maps the electronic transactions created and executed by and between the first and second transactional systems via the first and second messaging applications.

3. A unified electronic transaction management system as in claim 2, wherein the first messaging application contains a first set of rules relating to electronic transactions and interacting with the first transactional system that operates on the first transaction data in the first data format in accordance with the first set of rules, wherein the second messaging application contains a second set of rules relating to electronic transactions and interacting with the second transactional system that operates on the second transaction data in the second data format in accordance with the second set of rules, whereby the remote server processes in accordance with the set of rules and process maps the electronic transactions created and executed by and between the first and second transactional systems via the first and second messaging applications, and wherein the remote server processes the converted transaction data received from the first messaging application comprising executing the conversion rules to convert the converted transaction data received from the first messaging application corresponding to the first transactional system to processed converted transaction data to be transmitted to the messaging application corresponding to the second transactional system.

4. A unified electronic transaction management system as in claim 1, wherein the application service of the remote server comprises predefined process maps for different types of business processes, wherein during installation a system user chooses options in a series of web pages in the corresponding first and second transactional system to choose process options specific to its corresponding first and second transactional system that is tailored for the system user's organizational environment.

5. A unified electronic transaction management system as in claim 4, wherein web pages are presented to the system user to gather information required to execute the process maps, and wherein the application service utilizes the process options and the gathered information to execute the process maps, wherein the remote server routes electronic transactions requiring approval or to resolve exceptions, based on the process maps, the process options and the gathered information.

6. A unified electronic transaction management system as in claim 1, wherein the application service of the remote server further comprises application programming interfaces (APIs) that allow external parties to submit to and receive from the remote server electronic transactions for organizations that use the system.

7. A unified electronic transaction management system as in claim 1, wherein the application service of the remote server further comprises an application that an authorized representative of a user can download onto a server for the user's transactional system corresponding to the first or second transactional system, and wherein the application searches the contents of the user's transactional system to correctly identify the transactional system and version installed and validates said transactional system and version, prior to installing the messaging application on the server without requiring technology staff intervention.

8. A unified electronic transaction management system as in claim 7, wherein the application service of the remote server further comprises web pages to support an enrollment process, which allow the user to enroll to the application service by entering a series of data values pertinent to the user, wherein the application service of the remote server receives validation of key data entered by the user during the enrollment process, and wherein the application service of the remote server maintains and validates physical location and financial entity information for the user during and after the enrollment process.

9. A unified electronic transaction management system as in claim 7, wherein the messaging application is electronically signed to properly identify the organization on whose transactional system server it is installed.

10. A unified electronic transaction management system as in claim 1, wherein the first and second messaging applications are installed to be tailored to preexisting first and second transactional systems, respectively, by configuring the first and second messaging applications respectively to the corresponding preexisting first and second transactional systems, to allow the preexisting first and second transactional systems to conduct electronic transactions based on business rules and logics existing in the first and second messaging applications and the remote server without reconfiguration of the respective preexisting first and second transactional systems.

11. A unified electronic transaction management system as in claim 10, wherein the first and second messaging applications are installed and associated with preexisting first and second transactional systems, respectively, without requiring reprogramming or modification of the preexisting first and second transactional systems.

12. A unified electronic transaction management system as in claim 11, wherein the first and second messaging applications are custom configured to the respective first and second transactional systems using plug-ins, which include transactional system data converters, transactional system data logic, and transactional system connectors.

13. A unified electronic transaction management system as in claim 12, wherein the application service of the remote server is transactional system independent.

14. A unified electronic transaction management system as in claim 10, wherein: (a) for a cloud-based transactional system, the corresponding first or second messaging application is installed on a server of the cloud-based transactional system, or installed on the remote server, and (b) for a server-based transactional system, the corresponding first or second messaging application is installed on a server of the server-based transactional system.

15. A unified electronic transaction management system as in claim 10, wherein: (a) the application service of the remote server comprises web pages that gather credential information to allow user access to existing web pages and APIs remotely where the first or second transactional system is a cloud-based transactional system, and (b) the application service of the remote server comprises web pages that gather credential information to allow user access to existing screens and APIs remotely where the first or second transactional system is a server-based transactional system, and wherein the first or second messaging application is embedded into programming code of the first or second transactional system on a server-based transactional system.

16. A unified electronic transaction management system as in claim 15, wherein if one of the first and second messaging applications cannot connect to the remote server or encounters an error, it sends a message to a designated administrator, or wherein the application service of the remote server enables secure messages to be sent between system users to resolve any issues, while linking the secure messages to the electronic transaction between the first and second transactional systems.

17. A unified electronic transaction management system as in claim 1, wherein the application service of the remote server further comprises web pages that allow system users to enter transactions manually (non-electronic) into the remote server, or wherein the application service of the remote server provides an option to allow third parties to add applications and/or services to the unified electronic transaction management system.

18. A unified electronic transaction management system as in claim 1, wherein the remote server provides a series of online dashboards, inquiry pages and reports to allow the users of the unified electronic transaction management system to obtain the status of the electronic transactions in real-time regardless of whether the electronic transactions are in the first or second transactional system.

19. A process of unified management of electronic transactions between a first transactional system and a second transactional system over a network, comprising providing a unified electronic transaction management system as in claim 1, wherein the electronic transactions comprise a transaction relating to purchase of goods or services.

20. A unified electronic transaction management system as in claim 1, wherein the remote server utilizes the converted transaction data received from both the first and second transactional systems to process the electronic transactions, wherein the remote server receives and processes the first converted transaction data in the common data format received from the first messaging application, stores said converted transaction data in the database, and forwards the processed first converted transaction data in the common data format to the second messaging application, and wherein the remote server receives and processes the second converted transaction data in the common data format received from the second messaging application, stores the second converted transaction data in the database, and forwards said processed second converted transaction data in the common data format to the first messaging application, and wherein the first messaging application receives and converts the processed second converted transaction data in the common data format from the remote server into the first transaction data in the first data format, and loads the first transaction data in the first data format into the first transactional system, and wherein the first transaction data is loaded into the first transactional system without manual intervention, and the second messaging application receives and converts the processed first converted transaction data in the common data format from the remote server into the second transaction data in the second data format, and loads the second transaction data in the second data format into the second transactional system, and wherein the second transaction data is loaded into the second transactional system without manual intervention.

* * * * *